US011115605B2

United States Patent
Lee et al.

(10) Patent No.: US 11,115,605 B2
(45) Date of Patent: Sep. 7, 2021

(54) ELECTRONIC DEVICE FOR SELECTIVELY COMPRESSING IMAGE DATA ACCORDING TO READ OUT SPEED OF IMAGE SENSOR, AND METHOD FOR OPERATING SAME

(71) Applicant: Samsung Electronics Co., Ltd., Gyeonggi-do (KR)

(72) Inventors: Chang Woo Lee, Gyeonggi-do (KR); Do Han Kim, Gyeonggi-do (KR); Jin Min Bang, Gyeonggi-do (KR); Ha Joong Park, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/766,943

(22) PCT Filed: Nov. 1, 2018

(86) PCT No.: PCT/KR2018/013175
§ 371 (c)(1),
(2) Date: May 26, 2020

(87) PCT Pub. No.: WO2019/107769
PCT Pub. Date: Jun. 6, 2019

(65) Prior Publication Data
US 2021/0037191 A1    Feb. 4, 2021

(30) Foreign Application Priority Data

Dec. 1, 2017 (KR) .......................... 10-2017-0164588

(51) Int. Cl.
*H04N 5/265* (2006.01)
*H04N 5/378* (2011.01)
(Continued)

(52) U.S. Cl.
CPC ............. *H04N 5/265* (2013.01); *H04N 5/378* (2013.01); *H04N 5/907* (2013.01); *H04N 5/917* (2013.01)

(58) Field of Classification Search
CPC ...................................... H04N 5/265
(Continued)

(56) References Cited

U.S. PATENT DOCUMENTS 7,679,768 B2 * 3/2010 Unno ................. H04N 1/33307
358/1.15
2006/0244992 A1 11/2006 Iga et al.
(Continued)

FOREIGN PATENT DOCUMENTS

JP 2008-113112 A 5/2008
KR 10-2006-0114611 A 11/2006
(Continued)

*Primary Examiner* — Joel W Fosselman
(74) *Attorney, Agent, or Firm* — Cha & Reiter, LLC.

(57) ABSTRACT

Embodiments disclosed in the present document relate to a method and an apparatus for synthesizing images. An electronic device according to various embodiments of the present invention comprises: an image sensor; an image processing processor; and a control circuit which is electrically connected to the image sensor through a first designated interface and to the image processing processor through a second designated interface. The control circuit may be configured to: when the read out speed of the image sensor is set to a first designated speed, receive, through the first designated interface, first image data that has been obtained by using the image sensor and has not been compressed by the image sensor; transfer the first image data to the image processing processor through the second designated interface; when the read out speed of the image sensor is set to a second designated speed, receive, through the first designated interface, second image data being obtained by using the image sensor and being compressed (Continued)

by the image sensor; decompress the compressed second image data by means of the control circuit; and transfer the decompressed second image data to the image processing processor through the second designated interface.

15 Claims, 24 Drawing Sheets

(51) Int. Cl.
*H04N 5/907* (2006.01)
*H04N 5/917* (2006.01)

(58) Field of Classification Search
USPC ...................................................... 348/222.1
See application file for complete search history.

(56) References Cited

U.S. PATENT DOCUMENTS

| | | | |
|---|---|---|---|
| 2008/0095466 | A1 | 4/2008 | Kinrot et al. |
| 2014/0146194 | A1 | 5/2014 | Ju et al. |
| 2015/0163403 | A1 | 6/2015 | Wakabayashi |
| 2017/0076419 | A1 | 3/2017 | Fries et al. |
| 2017/0187971 | A1 | 6/2017 | Suzuki |

FOREIGN PATENT DOCUMENTS

| | | | |
|---|---|---|---|
| KR | 10-2015-0035722 A | 4/2015 | |
| KR | 10-2017-0031028 A | 3/2017 | |
| KR | 10-2017-0077784 A | 7/2017 | |

* cited by examiner

ELECTRONIC DEVICE FOR SELECTIVELY COMPRESSING IMAGE DATA ACCORDING TO READ OUT SPEED OF IMAGE SENSOR, AND METHOD FOR OPERATING SAME

CROSS-REFERENCE TO RELATED APPLICATION(S)

This application is a National Phase Entry of PCT International Application No. PCT/KR2018/013175, which was filed on Nov. 1, 2018 and claims priority to Korean Patent Application No. 10-2017-0164588, which was filed on Dec. 1, 2017, the contents of which are incorporated herein by reference.

BACKGROUND

1. Field

Various embodiments of the present disclosure relate to a method and apparatus for fusing images.

2. Description of the Related Art

With high integration of performance of portable electronic devices such as a smartphone, etc., services and additional functions provided through an electronic device have been diversified. Communication service providers or electronic device manufacturers have exerted much effort on mounting various components on electronic devices and developing related techniques to raise effective value of an electronic device and satisfy demands of various users.

Recently, an electronic device has mounted thereon a high-performance camera capable of obtaining various images. Users may photograph themselves or a background, by using a camera mounted on an electronic device. A camera module provided on the electronic device may generally include a lens for collecting light, a photodiode for converting the collected light into an analog electric signal, and an analog-to-digital converter (ADC) for converting the analog electric signal into a digital electric signal that is image data.

Meanwhile, a process of converting an electric signal from a photodiode into image data and outputting the image data may be referred to as a read-out operation, and a read-out speed of an image sensor may be generally slower than or equal to an output speed of an interface that connects the image sensor with an external electronic device (e.g., an application processor).

SUMMARY

To improve the quality of an image obtained through the camera module, a technique for fusing a plurality of frames may be used. Meanwhile, a motion artifact corresponding to movement of an object, etc., may occur when the plurality of frames are fused, and a noise phenomenon such as the motion artifact may be solved by reducing a time gap in obtaining adjacent frames.

An electronic device according to various embodiments of the present disclosure may reduce a time gap in obtaining adjacent frames by increasing a read-out speed of an image sensor, thereby reducing a noise phenomenon such as a motion artifact. When the read-out speed of the image sensor is increased according to various embodiments of the present disclosure, the amount of image data output through the image sensor within the same time period may be increased. Through the increased amount of image data, i.e., by fusing the plurality of frames, the quality of an image obtained through a camera module may be enhanced. Moreover, the image data obtained according to the increased read-out speed is not largely affected by a motion artifact corresponding to movement of an object, etc., such that the amount of computation may be reduced in fusing the adjacent frames.

Furthermore, the electronic device according to various embodiments of the present disclosure may include at least one compression module and decompression module to guarantee the performance of the image sensor based on the increased read-out speed while using the interface having a relatively low output speed. Based on the increased read-out speed, the image data obtained at a higher speed than the output speed of the interface may pass through the interface in a state of being compressed by the compression module, and the compressed image data may be transferred to the at least one processor (e.g., an image signal processor) after being decompressed by the decompression module. The electronic device according to various embodiments of the present disclosure may improve the quality of an image by fusing image data obtained at a high speed based on an increased read-out speed, and may overcome restrictions corresponding to the output speed of the interface by compressing or decompressing the image data.

An electronic device according to various embodiments of the present disclosure includes an image sensor including a compression module, an image processor, and a control circuit electrically connected to the image sensor through a first predetermined interface, and to the image processor through a second predetermined interface, and including one or more decompression modules, in which the control circuit is configured, in response to setting of a read-out speed of the image sensor to a first predetermined speed, to receive first image data through the first predetermined interface, the first image data having been acquired through the image sensor and not having been compressed by the compression module, and transfer the first image data to the image processor through the second predetermined interface, and in response to setting of the read-out speed of the image sensor to a second predetermined speed, to receive second image data through the first predetermined interface, the second image data having been acquired through the image sensor and compressed through the compression module, decompress the compressed second image data through the one or more decompression modules, and transfer the decompressed second image data to the image processor through the second predetermined interface.

A method for fusing an image in an electronic device having a control circuit according to various embodiments of the present disclosure includes, in response to setting of a read-out speed of an image sensor of the electronic device to a first predetermined speed, receiving first image data through a first predetermined interface of the electronic device, the first image data having been acquired through the image sensor and not having been compressed through a compression module included in the image sensor, and transferring the first image data to an image processor included in the electronic device through a second predetermined interface of the electronic device, by the control circuit, and in response to setting of the read-out speed of the image sensor to a second predetermined speed, receiving second image data through the first predetermined interface, the second image data having been acquired through the image sensor and compressed through the compression module, decompressing the received second image data through one or more decompression modules included in the control circuit, and transferring the decompressed second image data to the image processor through the second predetermined interface, by the control circuit.

An electronic device according to various embodiments of the present disclosure may improve the quality of an image by fusing image data obtained at a high speed based on an increased read-out speed.

In the electronic device according to various embodiments of the present disclosure, when an image sensor outputs the image data, the image data may be compressed and output, and the compressed image data may be used for fusion after being transferred to at least one processor and decompressed. In this way, the electronic device according to various embodiments of the present disclosure may overcome restrictions corresponding to an output speed of an interface between the image sensor and the at least one processor, and image data increased according to the increased read-out speed may be transferred from the image sensor to the at least one processor.

DETAILED DESCRIPTION

Hereinafter, various embodiments of the present disclosure will be disclosed with reference to the accompanying drawings.

Figure 1:
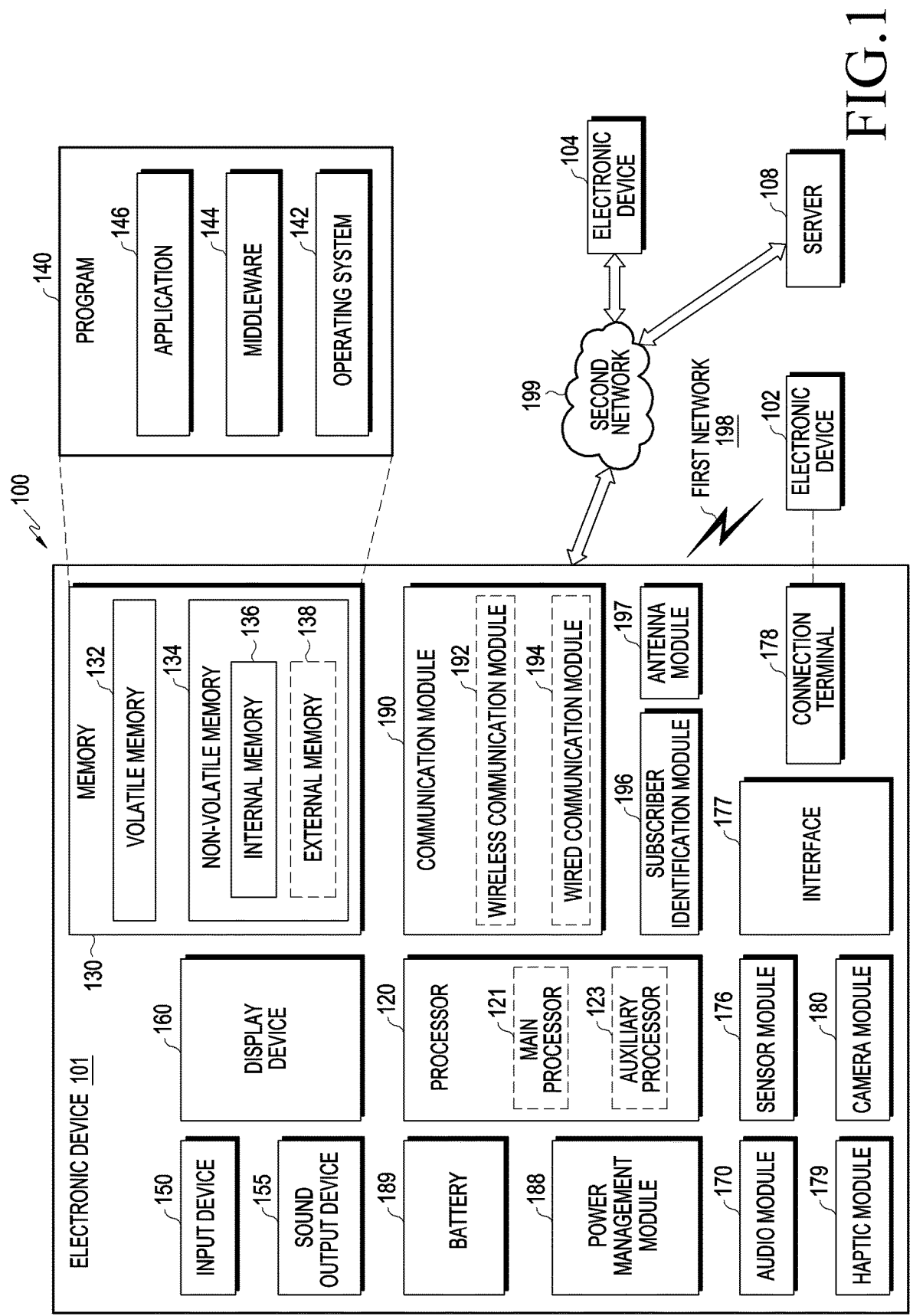
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiment, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 123 may include an auxiliary processor 123 (e.g., a graphics processing unit (GPU), an image signal processor (ISP), a sensor hub processor, or a communication processor) that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120) of the electronic device 101, e.g., software (e.g., the program 140) and input data or output data for a command related to the software.

The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. According to an embodiment, the display device 160 may include a touch circuitry or a pressure sensor capable of measuring the strength of a pressure with respect to a touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power-line communication module), and may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., an LAN or wide area network (WAN)). The above-enumerated types of communication modules 190 may be implemented in a single chip, where at least some of the modules are integrated, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
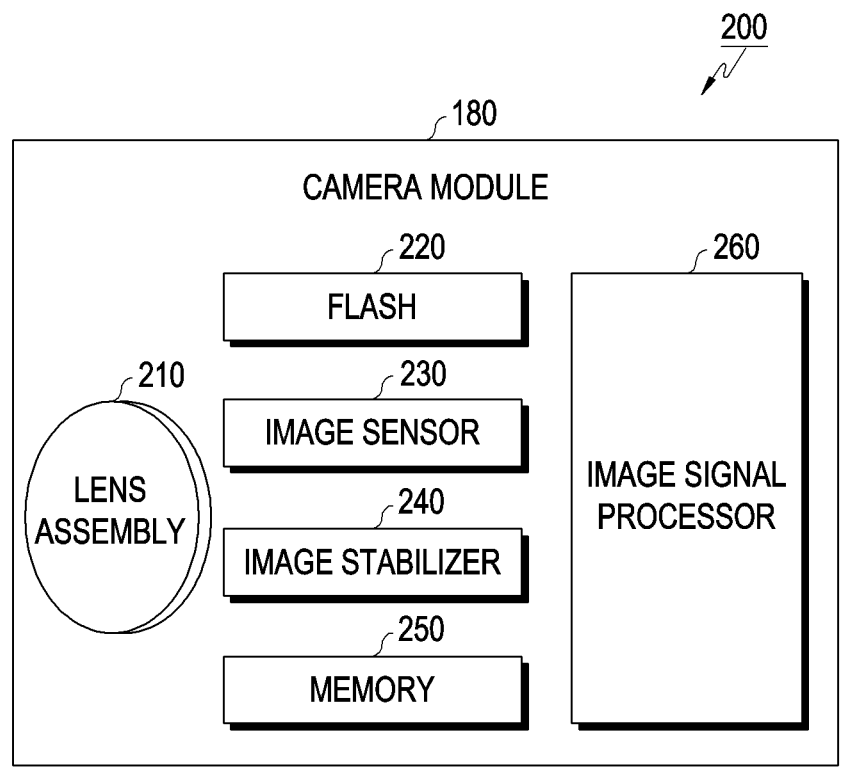
FIG. 2 is a block diagram 200 of a camera module 180 according to various embodiments.

FIG. 2 is a block diagram 200 of the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. The plurality of lens assemblies 210 may have the same lens attribute (e.g., view angle, focal length, auto-focusing, f number, or optical zoom), or at least one lens assembly may have at least one other lens attribute different from those of another lens assembly. The lens assembly 210 may include, for example, a wide-angle lens or a telephoto lens. The flash 220 may emit a light source that is used to reinforce light emitted from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented with, for example, a charged coupled device (CCD) sensor or a complementary metal oxide semiconductor (CMOS) sensor.

The image stabilizer 240 may move or control (e.g., adjust read-out timing) at least one lens included in the lens assembly 210 or the image sensor 230 to at least partially compensate for a negative influence (e.g., image blurring) of movement of the camera module 180 or the electronic device 101 including the same upon a captured image in response to the movement. According to an embodiment, the image stabilizer 240 may be implemented with, for example, an optical image stabilizer, and may sense such a movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 160. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening) on an image obtained by the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be transferred to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed, by the processor 120, via the display device 160 as it is or after being further processed.

According to an embodiment, the electronic device 101 may include two or more camera modules 180 having different attributes or functions. In this case, for example, at least one camera module 180 may be a wide-angle camera or a front camera, and at least one another camera module may be a telescopic camera or a rear camera.

An electronic device according to various embodiments may be one of various types of electronic devices, according to various embodiments of the present disclosure. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), functions corresponding to the instructions may be performed directly by the processor or using other components under control of the processor. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

An electronic device according to various embodiments of the present disclosure includes an image sensor including a compression module, an image processor, and a control circuit electrically connected to the image sensor through a first predetermined interface, and to the image processor through a second predetermined interface, and including one or more decompression modules, in which the control circuit is configured, in response to setting of a read-out speed of the image sensor to a first predetermined speed, to receive first image data through the first predetermined interface, the first image data having been acquired through the image sensor and not having been compressed by the compression module, and transfer the first image data to the image processor through the second predetermined interface, and in response to setting of the read-out speed of the image sensor to a second predetermined speed, to receive second image data through the first predetermined interface, the second image data having been acquired through the image sensor and compressed through the compression module, decompress the compressed second image data through the one or more decompression modules, and transfer the decompressed second image data to the image processor through the second predetermined interface.

The electronic device according to various embodiments of the present disclosure may further include a memory, in which the control circuit is configured to store at least one of the compressed second image data or the decompressed second image data in the memory.

The electronic device according to various embodiments of the present disclosure may further include a fusion module, in which the control circuit is configured, in response to setting of the read-out speed of the image sensor to the second predetermined speed, to receive one or more image data through the first predetermined interface, the one or more image data having been acquired through the image sensor and compressed by the compression module, and store the compressed one or more image data in the memory, in response to storage of a predetermined number of compressed image data in the memory, to decompress the compressed image data stored in the memory through the one or more decompression modules, to generate third image data by fusing the decompressed image data through the fusion module, and to transfer the generated third image data to the image processor through the second predetermined interface.

The electronic device according to various embodiments of the present disclosure may further include a fusion module, in which the control circuit is configured, in response to setting of the read-out speed of the image sensor to the second predetermined speed, to receive third image data through the first predetermined interface, the third image data having been acquired through the image sensor and compressed through the compression module, and decompress the compressed third image data through the one or more decompression modules, to generate fourth image data by fusing the decompressed second image data with the decompressed third image data through the fusion module, and to transfer the generated fourth image data to the image processor through the second predetermined interface.

The electronic device according to various embodiments of the present disclosure may further include one or more compression modules in the control circuit, in which the control circuit is configured to compress the generated fourth image data through the one or more compression modules, and store the compressed fourth image data in the memory, in response to setting of the read-out speed of the image sensor to the second predetermined speed, to receive fifth image data through the first predetermined interface, the fifth image data having been acquired through the image sensor and compressed through the compression module, and decompress the compressed fifth image data through the one or more decompression modules, to generate sixth image data by fusing the fourth image data stored in the memory with the decompressed fifth image data through the fusion module, and to transfer the generated sixth image data to the image processor through the second predetermined interface.

The electronic device according to various embodiments of the present disclosure may further include a statistics processing module, in which the control circuit is configured, if the fusion module is set in a first mode, to transfer at least one of the decompressed second image data or the decompressed third image data to the statistics processing module, and if the fusion module is set in a second mode, to transfer the generated fourth image data to the statistics processing module.

In the electronic device according to various embodiments of the present disclosure, the first mode may be a mode in which pixel values of a plurality of image data acquired through the image sensor in a first period within a predetermined time are averagely fused, and the second mode may be a mode in which pixel values of a plurality of image data acquired through the image sensor in a second period within the predetermined time are additively fused.

In the electronic device according to various embodiments of the present disclosure, each of the first predetermined interface and the second predetermined interface may include an interface conforming to the mobile industry processor interface (MIPI).

In the electronic device according to various embodiments of the present disclosure, the first predetermined speed may be equal to or less than an output speed of the first predetermined interface, and the second predetermined speed may be larger than the output speed of the first predetermined interface.

An image sensor according to various embodiments of the present disclosure may include a compression module, a decompression module, a fusion module, a memory, and a processor, in which the processor is configured to, in response to setting of a read-out speed of the image sensor to a first predetermined speed, to acquire first image data through the image sensor, and transfer the acquired first image data to an external electronic device through a predetermined interface, and in response to setting of the read-out speed of the image sensor to a second predetermined speed, to acquire second image data through the image sensor, compress the acquired second image data through the compression module, store the compressed second image data in the memory, decompress the second image data stored in the memory through the decompression module, in response to acquisition of third image data through the image sensor, generate fourth image data by fusing the decompressed second image data with the acquired third image data through the fusion module, compress the generated fourth image data through the compression module, and transfer the compressed fourth image data to the external electronic device through the predetermined interface.

Figure 3:
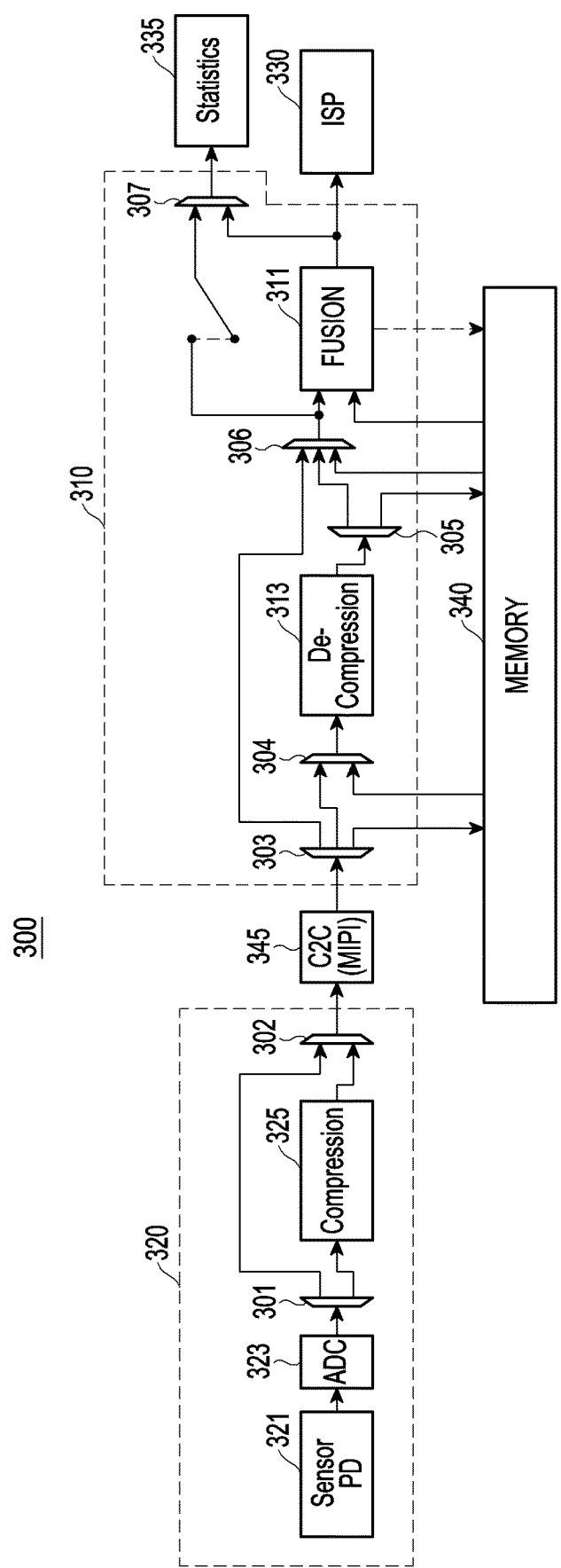
FIG. 3 is a block diagram showing a structure of an electronic device according to various embodiments.

FIG. 3 is a block diagram showing a structure of an electronic device according to various embodiments.

According to various embodiments of the present disclosure, an electronic device 300 may include at least one of a control circuit 310, an image sensor 320, an image processor 330, or a memory 340. The control circuit 310 and the image sensor 320 of the electronic device 300 may be connected with each other through at least one interface 345, and exchange data through the at least one interface 345. The electronic device 300 may include a statistics processing module 335 that manages statistically processed data. The electronic device 300 may also include multiplexers 302, 304, 306, and 307 and demultiplexers 301, 303, and 305 that may be used to exchange data between various components.

The components included in the electronic device 300 may correspond to components included in the electronic device 101 of FIG. 1, and the electronic device 300 may include all or some of the components included in the electronic device 101 in addition to the components shown in FIG. 3.

According to an embodiment, the control circuit 310 of the electronic device 300 may control operations of components included in the electronic device 300 and may execute instructions stored in the memory 340 of the electronic device 300. The control circuit 310 may mean the processor 120 of FIG. 1. For example, the processor 120 of FIG. 1 may include all or some of the control circuit 310, the image processor 330, and the statistics processing module 335. Thus, according to various embodiments, the control circuit 310 may mean the processor 120 and may be included in the processor, together with another module.

The control circuit 310 may include a fusion module 311 capable of fusing at least two image data acquired through the image sensor 320. The fusion module 311 may fuse a plurality of image data acquired in the image sensor 320 by using average fusion, additive fusion, complex fusion, divisional fusion, etc. (see FIGS. 14 through 17). The fusion module 311 may fuse the plurality of image data pixel-by-pixel or line-by-line.

The control circuit 310 may include at least one decompression module 313. The decompression module 313 may decompress data compressed in the other components of the image sensor 320 or the electronic device 300. Decompression may be performed in various ways, and a plurality of compressed image data may be simultaneously or sequentially decompressed through the at least one decompression module 313.

According to an embodiment, the image sensor 320 of the electronic device 300 may include all or some of the components included in the camera module 180 of FIG. 2. The image sensor 320 may also include a separate processor capable of independently controlling the components included in the image sensor 320. It would be easily understood by those of ordinary skill in the art that the components included in the image sensor 320 may not be construed as being limited by FIG. 3.

The image sensor 320 may include a photodiode 321. The photodiode 321, which is a photosensitive element, may generate at least one electric signal by using light received from outside. The photodiode 321 may include a pinned photodiode. The image sensor 320 may include a pixel array (not shown) including the photodiode 321. The pixel array may include a plurality of pixels including a plurality of photodiodes.

The image sensor 320 may include an analog-to-digital converter (ADC) 323. The ADC 323 may convert an analog electric signal generated from the photodiode 321 into digital image data and output the digital image data.

The image sensor 320 may include at least one compression module 325. The at least one compression module 325 may compress the image data output from the ADC 323. Compression may be performed in various ways, and a plurality of image data output from the ADC 323 may be simultaneously or sequentially compressed through the at least one compression module 325.

According to an embodiment, the image processor 330 of the electronic device 300 may mean the image signal processor 260 included in the camera module 180 of FIG. 2. Meanwhile, in FIG. 3, the image processor 330 is disclosed as being included separately from the control circuit 310, but without being limited thereto, it would be easily understood that the image processor 330 may be included in the control circuit 310 or the image sensor 320 according to a design change of the electronic device 300.

According to an embodiment, the statistics processing module 335 of the electronic device 300 may manage data used for accurate and fast computation of the control circuit 310. The statistics processing module 335 may be included in the control circuit 310 to perform a part of computation executed in the control circuit 310.

According to an embodiment, the memory 340 of the electronic device 300 may mean the memory 130 included in the electronic device 101 of FIG. 1. The electronic device 300 may include a plurality of memories 340. Meanwhile, in FIG. 3, the memory 340 is disclosed as being included separately from the control circuit 310, but without being limited thereto, it would be easily understood that the memory 340 may be included in the control circuit 310 or the image sensor 320 according to a design change of the electronic device 300.

According to an embodiment, the control circuit 310 and the image sensor 320 of the electronic device 300 may be connected with each other through at least one interface 345, and exchange data through the at least one interface 345. For example, the at least one interface 345, which is a chip to chip (C2C) interface, may include an interface defined according to the mobile industry processor interface (MIPI). The control circuit 310 and the image processor 330 of the electronic device 300 may be connected with each other through at least one interface (not shown), and exchange data through the at least one interface. For example, the at least one interface connecting the control circuit 310 with the image processor 330 may include an interface defined according to the MIPI. In addition, the at least one interface connecting the control circuit 310 with the image processor 330 may include various interfaces connecting the components included in the electronic device 300.

According to an embodiment, the multiplexers 302, 304, 306, and 307 or the demultiplexers 301, 303, and 305, capable of transmitting and receiving data in various ways, may be provided between the components of the electronic device 300. For example, the multiplexers 302, 304, 306, and 307, devices including a plurality of input lines and a single output line, may select one of a plurality of input analog or digital signals, and output the selected signal as the single output line. The demultiplexers 301, 303, and 305, devices including a single input line and a plurality of output lines, may output a signal, input through the single input line, through an output line selected from among the plurality of output lines.

Meanwhile, FIG. 3 has been provided to facilitate a description of the present disclosure, rather than to limit the present disclosure. The structure of the electronic device 300 according to various embodiments of the present disclosure is not limited by FIG. 3 and may be variously changed according to use and effects. The structure expressed as a module in the foregoing embodiment and embodiments to be described below may be understood to facilitate a description of a specific function or operation executed in the electronic device, and all functions or operations could be interpreted as being executed by a processor (e.g., the processor 120 of FIG. 1).

Figure 4A:
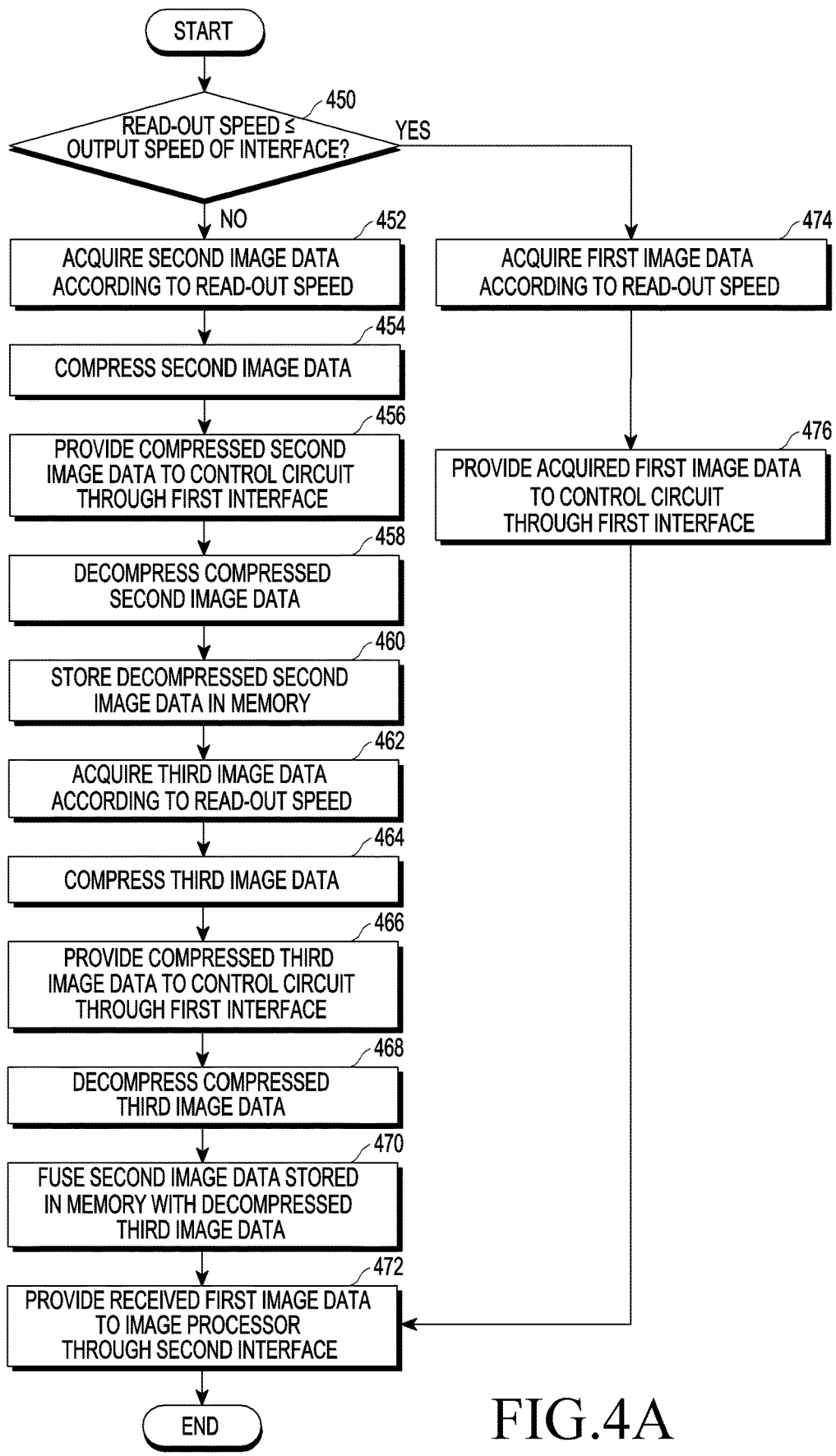
FIG. 4A through 4C are views for describing a method for fusing image data by using an electronic device, according to various embodiments.
Figure 4B:
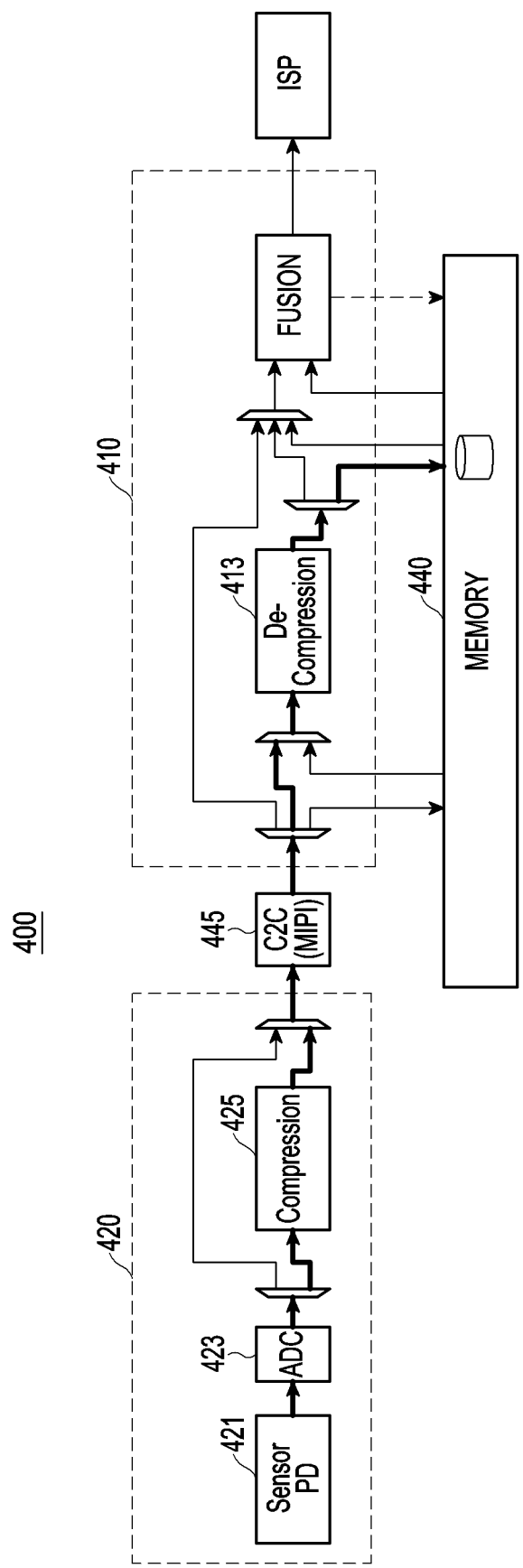
Figure 4C:
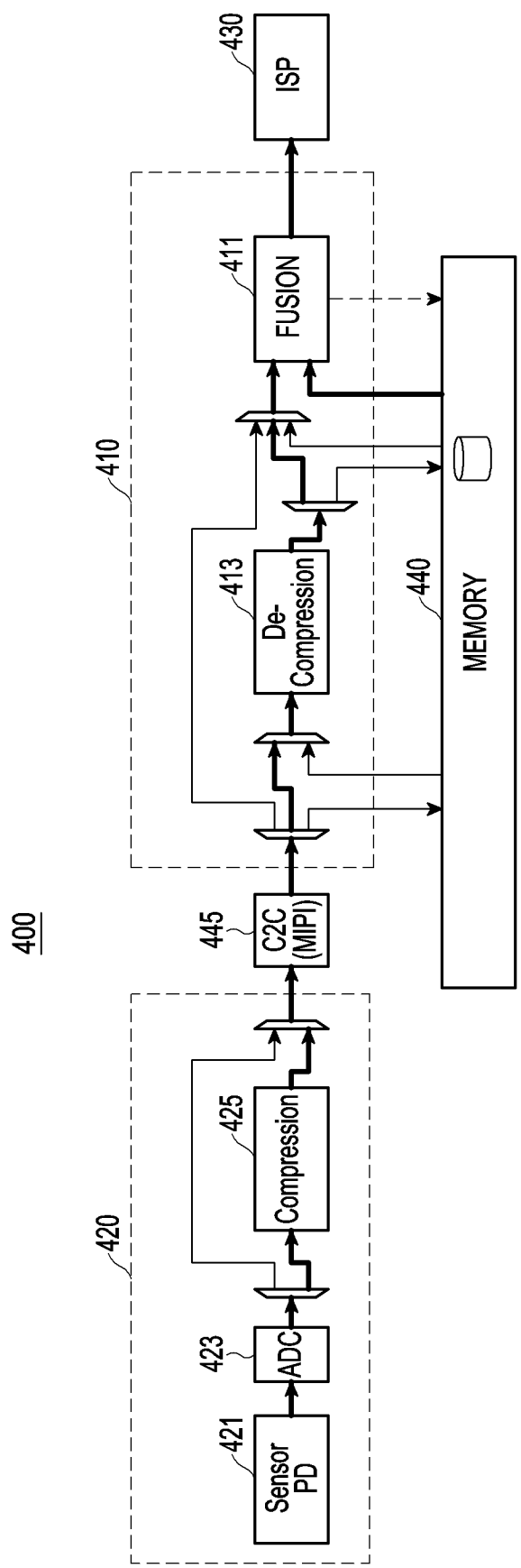

FIG. 4A through 4C are views for describing a method for fusing image data by using an electronic device, according to various embodiments. More specifically, FIG. 4A is a flowchart for describing operations performed by an electronic device 400 shown in FIGS. 4B and 4C. Thus, when the flowchart of FIG. 4A is described, the electronic device 400 according to FIGS. 4B and 4C will be referred to.

A subject that performs the method may be a control circuit 410 in the electronic device 400 including the control circuit 410 and an image sensor 420. The control circuit 410 may mean the processor 120 of FIG. 1. However, without being limited thereto, some of operations shown in FIG. 4A may be executed by a processor (not shown) separately included in an image processor 430 (e.g., the image signal processor 260 of FIG. 2) or the image sensor 420 (e.g., the image sensor 230 of FIG. 2). The electronic device 400 according to various embodiments of the present disclosure may include all or some of the components included in the electronic device 101 of FIG. 1 or the electronic device 300 of FIG. 3. According to various embodiments, the processor 120 of FIG. 1 may include all or some of the control circuit 410 and the image processor 430. Thus, the control circuit 410 may mean the processor 120 and may be included in the processor, together with another module. Meanwhile, functions and characteristics of the components described in FIG. 3 may be applied to the embodiments corresponding to FIGS. 4A through 4C and a redundant description will be omitted.

In operation 450, the processor 120 (e.g., the control circuit 410) may determine whether the read-out speed of the image sensor 420 is equal to or less than the output speed of an interface 445. For example, when it is determined that the output speed of the interface 445 is 30 fps and the read-out speed of the image sensor 420 is 30 fps, operation 474 may be performed ("Yes" in operation 450). On the other hand, when it is determined that the output speed of the interface 445 is 30 fps and the read-out speed of the image sensor 420 is 60 fps, operation 452 may be performed ("No" in operation 450).

In operation 474, the processor 120 (e.g., the control circuit 410) may acquire first image data according to the read-out speed of the image sensor 420. For example, when the read-out speed of the image sensor 420 is equal to or less than the output speed of the interface 445, the processor (e.g., the control circuit 410) may not perform compression with respect to the acquired image data. In operation 476, the processor 120 (e.g., the control circuit 410) may transfer the acquired first image data to the control circuit 410 through the interface 445 according to the read-out speed of the image sensor 420. In operation 472, the processor 120 (e.g., the control circuit 410) may transfer the received first image data to the image processor 430 through at least one interface (not shown).

Operations 452 through 460 according to various embodiments will be described with reference to FIG. 4B.

In operation 452, the processor 120 (e.g., the control circuit 410) may acquire second image data according to the read-out speed. For example, the read-out speed of the image sensor 420 may be 60 fps, and the output speed of the interface 445 may be 30 fps. In this case, the photodiode 421 of the image sensor 420 may generate an analog electric signal by using light received from outside. The ADC 423 of the image sensor 420 may convert an analog electric signal generated from the photodiode 421 into digital image data.

The read-out process including an operation of generating the analog electric signal by using the light received from outside and an operation of converting the generated analog electric signal into the digital image data may be performed once per 1/60 seconds according to the read-out speed set to 60 fps.

In operation 454, the processor 120 (e.g., the control circuit 410) may compress the second image data. The processor 120 (e.g., the control circuit 410) may compress the acquired second image data through a compression module 425. A compression rate or a compression method may be determined variously based on the read-out speed of the image sensor 420 and the output speed of the interface 445. For example, when the read-out speed of the image sensor 420 is 60 fps and the output speed of the interface 445 is 30 fps, the read-out speed of the image sensor 420 is two times faster than the output speed of the interface 445, such that a compression rate of the second image data may be set to double that of the interface 445. As the acquired image data is compressed through the compression module 425, the processor 120 (e.g., the control circuit 410) may transfer a larger amount of image data to the control circuit 410 through the interface 445 during the same time period. However, this is merely an example, and the compression rate or the compression method may be determined variously according to settings of the processor 120 (e.g., the control circuit 410).

In operation 456, the processor 120 (e.g., the control circuit 410) may transfer the compressed second image data to the control circuit 410 through the interface 445.

In operation 458, the processor 120 (e.g., the control circuit 410) may decompress the compressed second image data that has been transferred through the interface 445. The compressed second image data may be decompressed through the decompression module 413. Settings of the decompression module 413 may correspond to settings of the compression module 425. For example, when the compression rate of compression performed by the compression module 425 is set to two times, the decompression rate of decompression performed by the decompression module 413 may be set to two times. However, this is merely an example, and the compression rate and the decompression rate may be set differently according to settings and the compression method.

In operation 460, the processor 120 (e.g., the control circuit 410) may store the decompressed second image data in a memory 440. Meanwhile, in the current embodiment, the compressed second image data, which has been transferred through the interface 445, is decompressed and then stored in the memory, but the present disclosure is not limited to this embodiment. According to another embodiment, the processor 120 (e.g., the control circuit 410) may store the compressed second image data, which has been transferred through the interface 445, in the memory 440 without being decompressed. In this case, the second image data stored as being compressed in the memory 440 may be decompressed before later fusion of image data.

Operations 462 through 472 according to various embodiments will be described with reference to FIG. 4C. An embodiment corresponding to FIG. 4C may mean a process performed successively from an embodiment corresponding to FIG. 4B. The embodiment corresponding to FIG. 4C may start during execution of the embodiment corresponding to FIG. 4B.

In operation 462, the processor 120 (e.g., the control circuit 410) may acquire third image data according to the read-out speed. For example, the read-out speed of the image sensor 420 may be 60 fps, and the output speed of the interface 445 may be 30 fps. The processor 120 (e.g., the control circuit 410) may acquire third image data at 60 fps.

In operation 464, the processor 120 (e.g., the control circuit 410) may compress the third image data. The processor 120 (e.g., the control circuit 410) may compress the acquired third image data through the compression module 425. The compression rate or the compression method may be determined variously based on the read-out speed of the image sensor 420 and the output speed of the interface 445.

In operation 466, the processor 120 (e.g., the control circuit 410) may transfer the compressed third image data to the control circuit 410 through the interface 445.

In operation 468, the processor 120 (e.g., the control circuit 410) may decompress the compressed third image data transferred through the interface 445. The compressed third image data may be decompressed through the decompression module 413.

In operation 470, the processor 120 (e.g., the control circuit 410) may fuse the second image data stored in the memory 440 with the decompressed third image data. For example, at least two image data may be fused through a fusion module 411. Meanwhile, the second image data has been stored in the memory 440 after being decompressed, in operation 460. The processor 120 (e.g., the control circuit 410) may read the decompressed second image data stored in the memory 440 and allocate the read second image data as an input of the fusion module 411. The processor 120 (e.g., the control circuit 410) may also transfer the third image data decompressed in operation 468 to the fusion module 411, thus allocating the transferred third image data as the input of the fusion module 411. The fusion module 411 may fuse the second image data with the third image data based on a preset mode. Herein, the preset mode may include at least one of an average fusion mode, an additive fusion mode, a complex fusion mode, or a divisional fusion mode.

In operation 472, the processor 120 (e.g., the control circuit 410) may transfer the fused image data to the image processor 430 through at least one interface (not shown). Herein, the at least one interface may mean an interface that plays the same role as the interface 445. The at least one interface may not be limited as long as it is a means through which data exchange is possible between the component of the processor 120 (e.g., the control circuit 410). According to another embodiment, when the image processor 430 is designed as being included in the control circuit 410, at least one interface may be omitted.

Some of the operations shown in FIG. 4A may be omitted or repeated a plurality of times. Each of the operations shown in FIG. 4A may be reasonably regarded as an embodiment, and any one of them may not be restrictively construed as depending on another operation.

Figure 5:
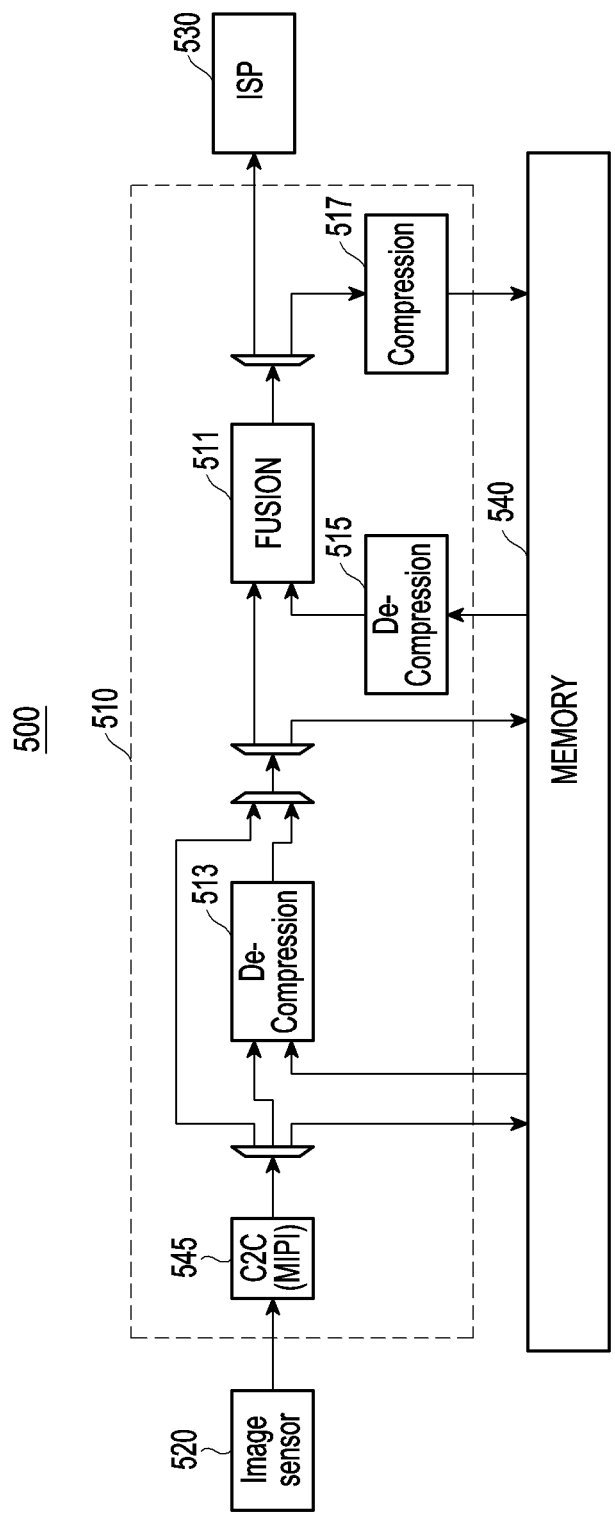
FIG. 5 is a view for describing a method for fusing image data in an infinite impulse response (IIR) manner in an electronic device, according to various embodiments.

FIG. 5 is a view for describing a method for fusing image data in an infinite impulse response (IIR) manner in an electronic device, according to various embodiments.

A subject that performs the method may be a control circuit 510 in the electronic device 500 including the control circuit 510 and an image sensor 520. The control circuit 510 may mean the processor 120 of FIG. 1. However, without being limited thereto, some operations of the method may be executed by a processor (not shown) separately included in an image processor 530 (e.g., the image signal processor 260 of FIG. 2) or the image sensor 520 (e.g., the image sensor 230 of FIG. 2). The electronic device 500 according to various embodiments of the present disclosure may include all or some of the components included in the electronic device 101 of FIG. 1 or the electronic device 300 of FIG. 3. According to various embodiments, the processor 120 of FIG. 1 may include all or some of the control circuit 510 and the image processor 530. Thus, the control circuit 510 may mean the processor 120 and may be included in the processor, together with another module. Meanwhile, functions and characteristics of the components described in FIG. 3 may be applied to the embodiment corresponding to FIG. 5 and a redundant description will be omitted.

According to an embodiment, the electronic device 500 may include a control circuit 510, an image sensor 520, an image processor 530, a memory 540, and an interface 545. The control circuit 510 may include a fusion module 511 capable of fusing at least two image data. The control circuit 510 may include at least one compression module 515 and at least one of decompression modules 513 and 515.

According to an embodiment, the electronic device 500 may transfer first image data, which has been acquired using the image sensor 520 and compressed through a compression module (not shown) included in the image sensor 520, to the control circuit 510 through the interface 545. The control circuit 510 may decompress the compressed first image data, transferred through the interface 545, through the decompression module 513. The control circuit 510 may also transfer the first image data decompressed through the decompression module 513 to the fusion module 511. According to another embodiment, the electronic device 500 may store the compressed first image data, transferred through the interface 545, in the memory 540 without being decompressed, or may store the first image data decompressed through the decompression module 513 in the memory 540.

According to an embodiment, when the decompressed first image data is transferred to the fusion module 511, the control circuit 510 may search the memory 540 to determine whether there is pre-stored image data. When no pre-stored image data is found in the memory 540, the control circuit 510 may transfer the decompressed first image data, transferred to the fusion module 511, to the compression module 517. The decompressed first image data transferred to the compression module 517 may be re-compressed through the compression module 517 and stored in the memory 540.

The electronic device 500 may transfer second image data, which has been acquired using the image sensor 520 and compressed through a compression module (not shown) included in the image sensor 520, to the control circuit 510 through the interface 545. The control circuit 510 may decompress the compressed second image data, transferred through the interface 545, through the decompression module 513. The control circuit 510 may also transfer the second image data decompressed through the decompression module 513 to the fusion module 511. When the decompressed second image data is transferred to the fusion module 511, the control circuit 510 may search the memory 540 to determine whether there is pre-stored image data. In this case, the pre-stored first image data may be found. The control circuit 510 may decompress the first image data stored in the memory 540 through the decompression module 515, and transfer the decompressed first image data as an input of the fusion module 511. The fusion module 511 may generate third image data by fusing the decompressed first image data with the decompressed second image data.

According to an embodiment, when the third image data is generated through the fusion module 511, the control circuit 510 may determine whether a preset number of times of fusion is satisfied. For example, when the preset number of times of fusion (e.g., 1) is satisfied, the generated third image data may be transferred to the image processor 530 through at least one interface. On the other hand, when the preset number of times of fusion is not satisfied, the generated third image data may be compressed through the compression module 513 and then stored in the memory 540.

The electronic device 500 may transfer fourth image data, which has been acquired using the image sensor 520 and compressed through a compression module (not shown) included in the image sensor 520, to the control circuit 510 through the interface 545. The control circuit 510 may decompress the compressed fourth image data, transferred through the interface 545, through the decompression module 513. The control circuit 510 may also transfer the fourth image data decompressed through the decompression module 513 to the fusion module 511. When the decompressed fourth image data is transferred to the fusion module 511, the control circuit 510 may search the memory 540 to determine whether there is pre-stored image data. In this case, the pre-stored third image data may be found. The control circuit 510 may decompress the third image data stored in the memory 540 through the decompression module 515, and transfer the decompressed third image data as an input of the fusion module 511. The fusion module 511 may generate fifth image data by fusing the decompressed third image data with the decompressed fourth image data.

According to an embodiment, when the fifth image data is generated through the fusion module 511, the control circuit 510 may determine whether a preset number of times of fusion is satisfied. For example, when the preset number of times of fusion (e.g., 2) is satisfied, the generated fifth image data may be transferred to the image processor 530 through at least one interface. On the other hand, when the preset number of times of fusion is not satisfied, the generated fifth image data may be compressed through the compression module 513 and then stored in the memory 540.

In this way, the electronic device 500 according to an embodiment may fuse image data in an IIR manner.

Figure 6:
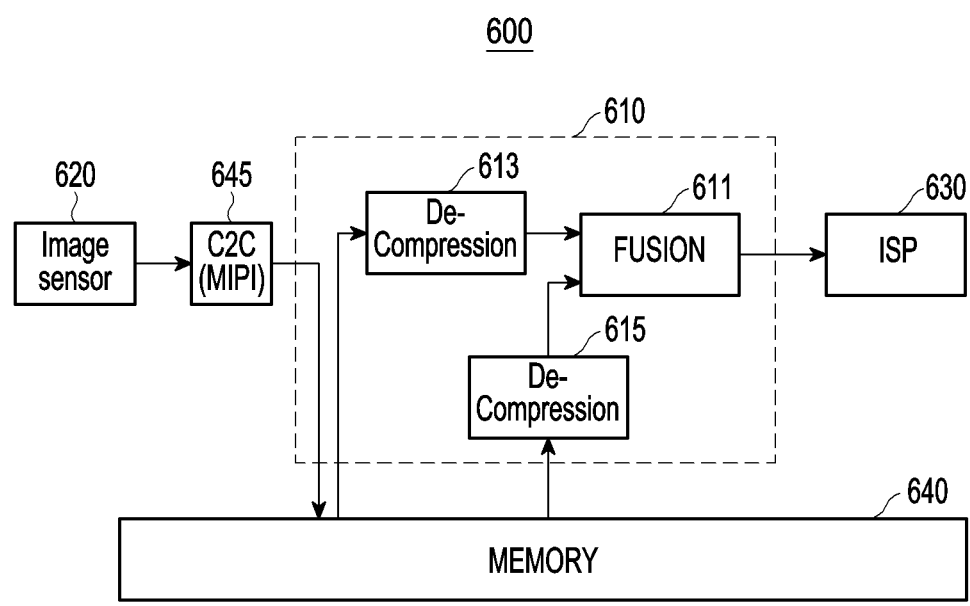
FIG. 6 is a view for describing a method for fusing image data in a finite impulse response (FIR) manner in an electronic device, according to various embodiments.

FIG. 6 is a view for describing a method for fusing image data in a finite impulse response (FIR) manner in an electronic device, according to various embodiments.

A subject that performs the method may be a control circuit 610 in the electronic device 600 including the control circuit 610 and an image sensor 620. The control circuit 610 may mean the processor 120 of FIG. 1. However, without being limited thereto, some operations of the method may be executed by a processor (not shown) separately included in an image processor 630 (e.g., the image signal processor 260 of FIG. 2) or the image sensor 620 (e.g., the image sensor 230 of FIG. 2). The electronic device 600 according to various embodiments of the present disclosure may include all or some of the components included in the electronic device 101 of FIG. 1 or the electronic device 300 of FIG. 3. According to various embodiments, the processor 120 of FIG. 1 may include all or some of the control circuit 610 and the image processor 630. Thus, the control circuit 610 may mean the processor 120 and may be included in the processor, together with another module. Meanwhile, functions and characteristics of the components described in FIG. 3 may be applied to the embodiment corresponding to FIG. 6 and a redundant description will be omitted.

According to an embodiment, the electronic device 600 may include a control circuit 610, an image sensor 620, an image processor 630, a memory 640, and an interface 645. The control circuit 610 may include a fusion module 611 capable of fusing at least two image data. The control circuit 610 may further include at least one of decompression modules 613 and 615.

According to an embodiment, the electronic device 600 may transfer first image data, which has been acquired using the image sensor 620 and compressed through a compression module (not shown) included in the image sensor 620, to the control circuit 610 through the interface 645. The control circuit 610 may store the compressed first image data, transferred through the interface 645, in the memory 640.

The electronic device 600 may determine whether the number of image data stored in the memory 640 meets a preset number, in response to storage of the compressed first image data in the memory 640. For example, when determining that the preset number (e.g., 1) is met, the electronic device 600 may decompress the compressed first image data stored in the memory 640 through at least one decompression module. The decompressed first image data may pass through the fusion module 611 and be transferred to the image processor 630 through at least one interface.

When determining that the preset number is not met, the electronic device 500 may transfer second image data, compressed through a compression module (not shown) included in the image sensor 620, to the control circuit 610 through the interface 645. The control circuit 610 may store the compressed second image data, transferred through the interface 645, in the memory 640.

The electronic device 600 may determine whether the number of image data stored in the memory 640 meets a preset number, in response to storage of the compressed second image data in the memory 640. For example, when determining that the preset number (e.g., 2) is met, the electronic device 600 may simultaneously or sequentially decompress the compressed first image data and second image data, stored in the memory 640, through at least one decompression module. The decompressed first image data and second image data may be transferred as an input of the fusion module 611. The fusion module 611 may generate third image data by fusing the decompressed first image data with the decompressed second image data. The generated third image data may be transferred to the image processor 630 through at least one interface.

When determining that the preset number is not met, the electronic device 600 may transfer one or more image data, compressed through a compression module (not shown) included in the image sensor 620, to the control circuit 610 through the interface 645, and may repeat this operation until determining that the preset number is met.

Meanwhile, two decompression modules are shown in FIG. 6, but a plurality of decompression modules may be provided corresponding to a preset number, and the fusion module 611 may simultaneously receive image data decompressed through the plurality of decompression modules and perform fusion with respect to the received image data.

Figure 7:
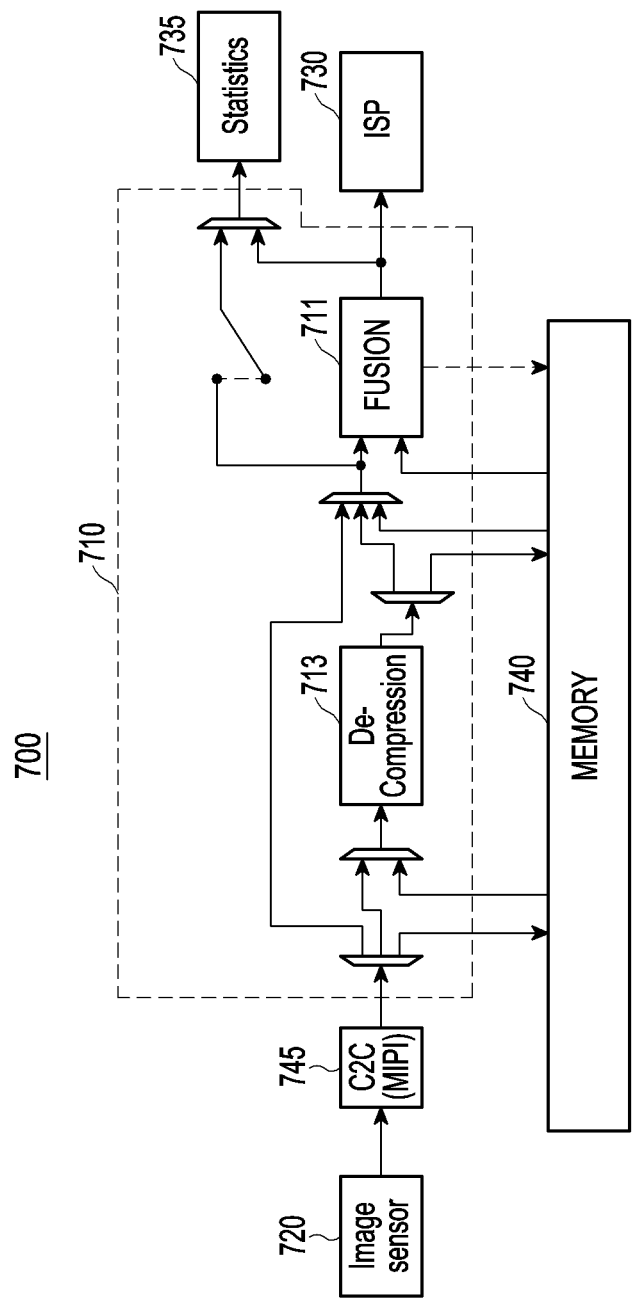
FIG. 7 is a block diagram for describing a method for using statistically processed data in an electronic device, according to various embodiments of the disclosure.

FIG. 7 is a block diagram for describing a method for using statistically processed data in an electronic device, according to various embodiments of the disclosure.

A subject that performs the method may be a control circuit 710 in the electronic device 700 including the control circuit 710 and an image sensor 720. The control circuit 710 may mean the processor 120 of FIG. 1. However, without being limited thereto, some operations of the method may be executed by a processor (not shown) separately included in an image processor 730 (e.g., the image signal processor 260 of FIG. 2) or the image sensor 720 (e.g., the image sensor 230 of FIG. 2). The electronic device 700 according to various embodiments of the present disclosure may include all or some of the components included in the electronic device 101 of FIG. 1 or the electronic device 300 of FIG. 3. According to various embodiments, the processor 120 of FIG. 1 may include all or some of the control circuit 710 and the image processor 730. Thus, the control circuit 710 may mean the processor 120 and may be included in the processor, together with another module. Meanwhile, functions and characteristics of the components described in FIG. 3 may be applied to the embodiment corresponding to FIG. 7 and a redundant description will be omitted.

According to an embodiment, the electronic device 700 may include a control circuit 710, an image sensor 720, an image processor 735, a statistics processing module 735, a memory 740, and an interface 745. The control circuit 710 may include a fusion module 711 capable of fusing at least two image data. The control circuit 710 may include at least one decompression module 713.

According to an embodiment, the statistics processing module 735 may store information related to an autofocus (AF) function, an auto white balance (AWB) function, and an auto exposure (AE) function, and extract statistically meaningful data from the stored information. For example, the statistics processing module 735 may store computation information of the AF function with respect to a preset region of interest (RoI) or may perform computation related to the AF function based on the stored information. The statistics processing module 735 may store white balance information or exposure information regarding an entire area of the acquired image, or perform computation related to the AWB function and the AE function based on the stored information.

According to another embodiment, the statistics processing module 735 may manage movement information regarding the RoI. For example, the statistics processing module 735 may acquire a plurality of image data regarding a preset RoI by using a continuous AF function, and perform computation for sensing movement made in the preset RoI from the acquired image data. The statistics processing module 735 may previously store a result of the computation and further use a pre-stored result of computation while performing the computation.

According to another embodiment, the statistics processing module 725 may store information related to face detection or perform computation related to face detection by using the stored information. For example, when a face is detected from an image, the statistics processing module 735 may store computation information used in face detection and may detect a new face based on the stored information.

According to an embodiment, when a fusion scheme performed by the fusion module 711 is average fusion, the statistics processing module 735 may receive input data of the fusion module 711. For example, when determining that the fusion scheme performed by the fusion module 711 is average fusion, the statistics processing module 735 may receive data input to the fusion module 711 and store the received data. On the other hand, when the fusion scheme performed by the fusion module 711 is additive fusion, the statistics processing module 735 may receive output data of the fusion module 711. For example, when determining that the fusion scheme performed by the fusion module 711 is additive fusion, the statistics processing module 735 may receive data output from the fusion module 711 and store the received data.

Figure 8:
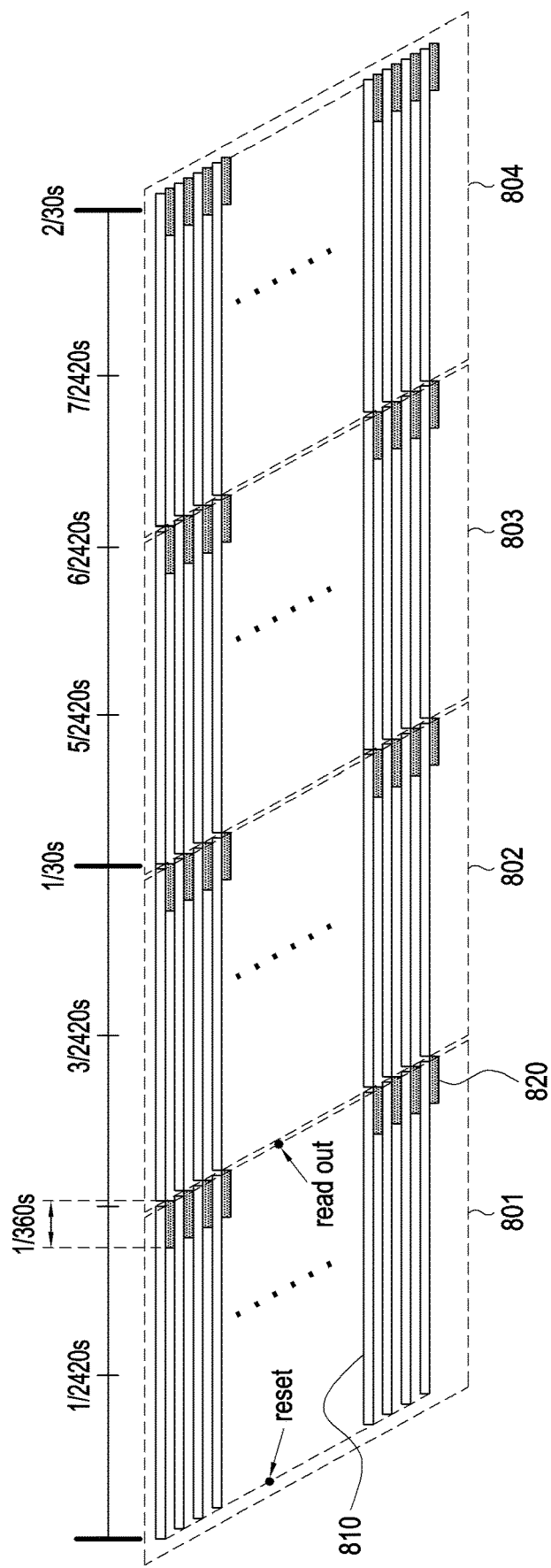
FIG. 8 is a view for describing a time at which a read-out operation is performed in an image sensor, according to various embodiments.

FIG. 8 is a view for describing a time at which a read-out operation is performed in an image sensor, according to various embodiments.

According to an embodiment, the read-out speed of the image sensor may be set to 60 fps. In this case, the image sensor may output image data once per 1/60 second. Referring to FIG. 8, it may be seen that reset and read-out are performed every 1/60 seconds. For example, first image data 801 may be image data acquired using light received between 0 seconds and 2/120 seconds, second image data 802 may be image data acquired using light received between 2/120 seconds and 4/120 seconds, third image data 803 may be image data acquired using light received between 4/120 and 6/120, and fourth image data 804 may be image data acquired using light received between 6/120 and 8/120.

Referring to FIG. 8, a pixel array of the image sensor may include pixel lines 810 that receive light during 1/60 seconds and generate a part of image data and pixel lines 820 that receive light during 1/360 seconds and generate a part of image data. In this case, the first image data 801 may include image data generated from the pixel lines 810 exposed to light during 1/60 seconds and image data generated from the pixel lines 820 exposed to light during 1/360 seconds.

Figure 9A:
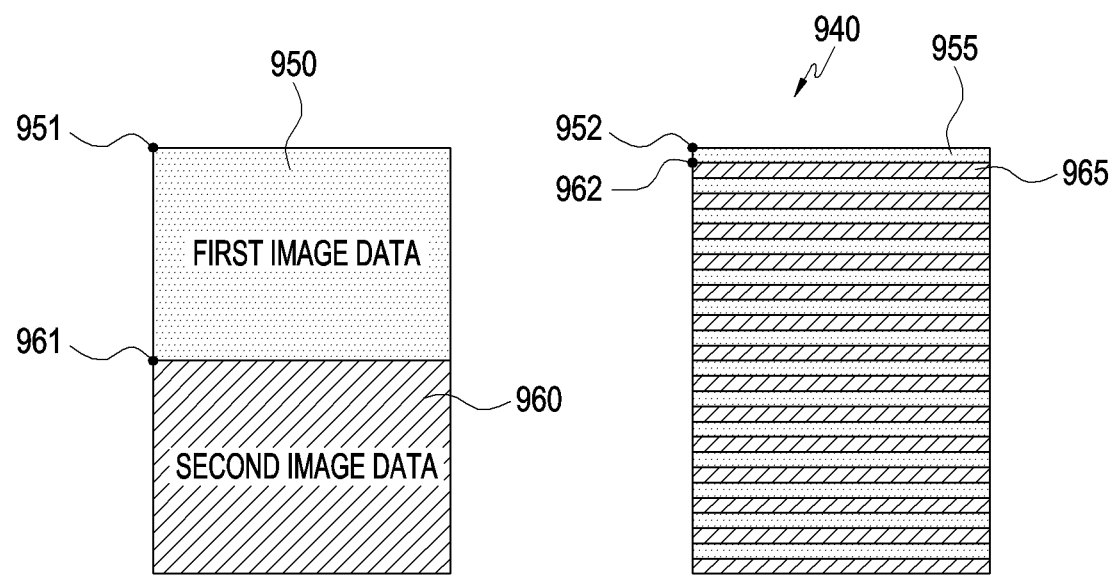
FIGS. 9A and 9B are views for describing a method for storing image data in a memory of an electronic device, according to various embodiments.
Figure 9B:
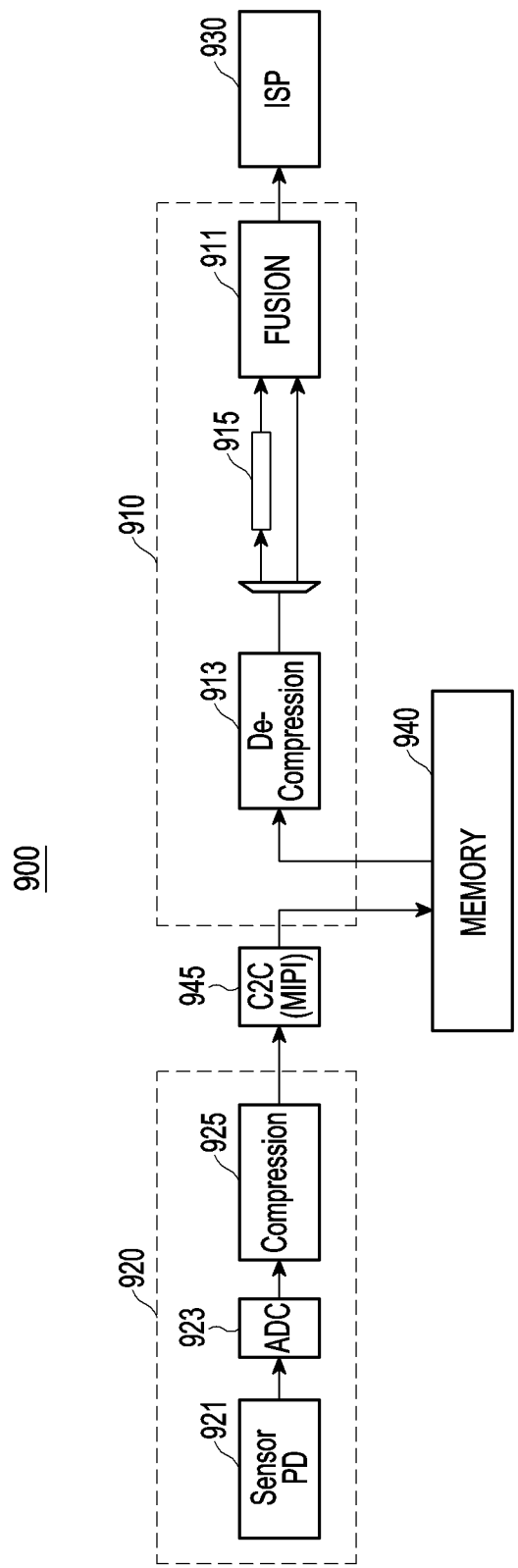

FIGS. 9A and 9B are views for describing a method for storing image data in a memory of an electronic device, according to various embodiments.

A subject that performs the method may be a control circuit 910 in the electronic device 900 including the control circuit 910 and an image sensor 920. The control circuit 910 may mean the processor 120 of FIG. 1. However, without being limited thereto, some operations of the method may be executed by a processor (not shown) separately included in an image processor 930 (e.g., the image signal processor 260 of FIG. 2) or the image sensor 920 (e.g., the image sensor 230 of FIG. 2). The electronic device 900 according to various embodiments of the present disclosure may include all or some of the components included in the electronic device 101 of FIG. 1 or the electronic device 300 of FIG. 3. Meanwhile, functions and characteristics of the components described in FIG. 3 may be applied to the embodiments corresponding to FIGS. 9A and 9B and a redundant description will be omitted.

According to an embodiment, the electronic device 900 may include a control circuit 910, an image sensor 920, an image processor 930, a memory 940, and an interface 945. The control circuit 910 may include a fusion module 911 capable of fusing at least two image data. The control circuit 910 may include at least one decompression module 913 and a buffer 915 that may temporarily store at least one image data. The image sensor 920 may include a photodiode 921, an ADC 923, and a compression module 925.

According to an embodiment, when storing at least two image data acquired through the image sensor 920 in the memory 940, the electronic device 900 may divide each of the at least two image data into data in preset units and store the divided data in the memory 940 in an interleaving manner.

Referring to FIG. 9A, the electronic device 900 may acquire first image data 950 and second image data 960 through the image sensor 920. According to an embodiment, the first image data 950 and the second image data 960 may be divided for each of a plurality of pixel lines constituting the pixel array of the image sensor 920 and may be stored in the memory 940 in the interleaving manner. For example, first data 955, which is first data among the divided data of the first image data 950, may be allocated with a base address 952 that is the same as a base address 951 of the first image data 950, and then may be stored in the memory 940. Next, second data 965, which is first data among the divided data of the second image data 960, may be allocated with a base address 962 that is the same as a base address 961 of the second image data 960, and then may be stored in the memory 940 successively from the first data 955. According to the foregoing interleaving manner, the first image data 950 and the second image data 960 may be stored in the memory 940.

Referring to FIG. 9B, the electronic device 900 may transfer two or more image data, which has been acquired using the image sensor 920 and compressed through the compression module 925 included in the image sensor 920, to the control circuit 910 through the interface 945. The control circuit 910 may store the two or more compressed image data, transferred through the interface 945, in the memory 940.

According to an embodiment, the control circuit 910 may store the two or more compressed image data in the memory 940 in the interleaving manner corresponding to FIG. 9A. For example, the first image data 950 and the second image data 960 may be divided for each of a plurality of pixel lines constituting the pixel array of the image sensor 920 and may be stored in the memory 940 in the interleaving manner.

According to an embodiment, the control circuit 910 may read the first image data 950 and the second image data 960, which have been stored in the memory 940 in the interleaving manner. In this case, the data read first from the memory 940 may be the first data 955 that is the first data among the divided data of the first image data 950. The control circuit 910 may decompress the read first data 955 through the decompression module 913, and temporarily store the decompressed first data 955 in the buffer 915. The data read from the memory 940 may be the second data 965 that is the first data among the divided data of the second image data 960. The control circuit 910 may decompress the read second data 965 through the decompression module 913, and transfer the decompressed second data 965 to the fusion module 911. In this case, the first data 955 stored in the buffer 915 may be transferred to the fusion module 911. The fusion module 911 may fuse the first data 955 stored in the buffer 915 with the decompressed second data 965 to generate the third data. The generated third image data may be transferred to the image processor 930 through at least one interface. In this way, the control circuit 910 may repeat an operation of sequentially reading data stored in the memory 940 and then fusing the read data through the fusion module 911. Thus, the data divided from the first image data 950 and the data divided from the second image data 960 may be fused through the fusion module 911, and transferred to the image processor 930 through at least one processor. The image processor 930 may fuse the generated data again, thus acquiring image data that may be generated when the first image data 950 and the second image data 960 are fused without division.

Figure 10:
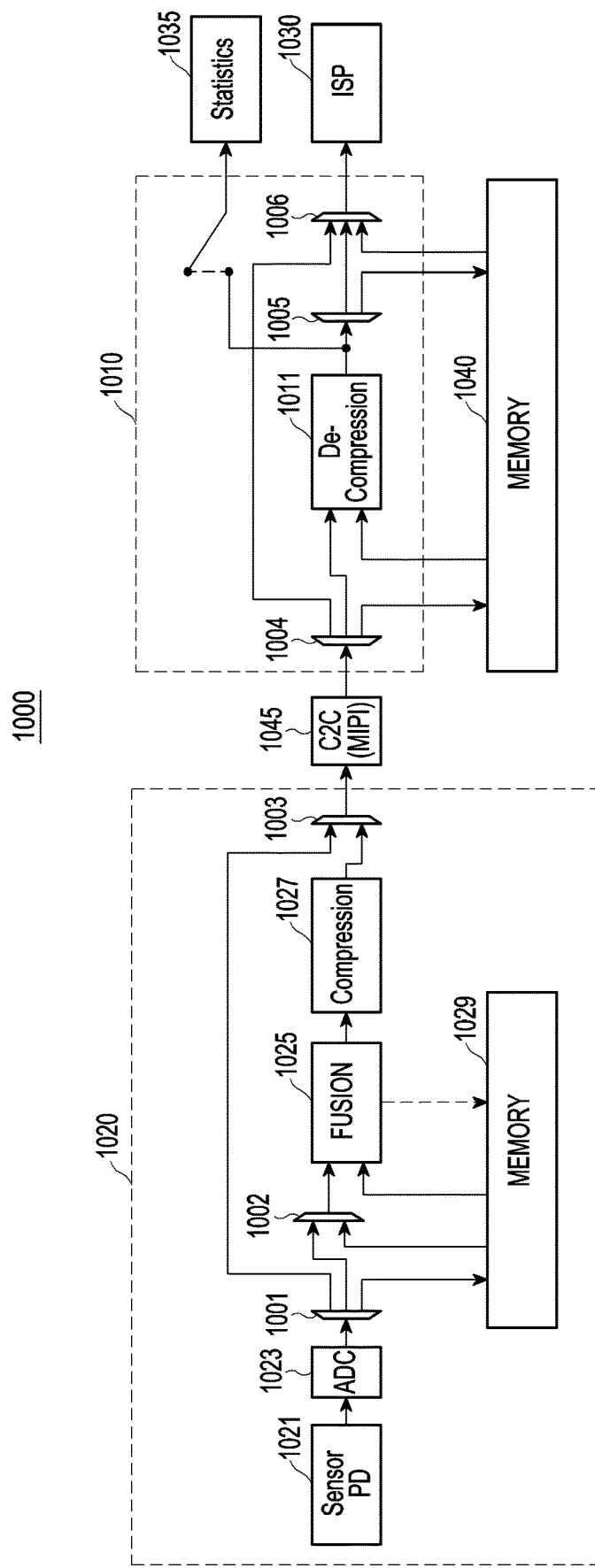
FIG. 10 is a block diagram showing a structure of an electronic device according to various embodiments.

FIG. 10 is a block diagram showing a structure of an electronic device according to various embodiments.

According to various embodiments of the present disclosure, an electronic device 1000 may include at least one of a control circuit 1010, an image sensor 1020, an image processor 1030, or a memory 1040. The control circuit 1010 and the image sensor 1020 of the electronic device 1000 may be connected with each other through at least one interface 1045, and exchange data through the at least one interface 1045. The electronic device 1000 may include a statistics processing module 1035 that manages statistically processed data. The electronic device 1000 may also include multiplexers 1002, 1003, and 1006 and demultiplexers 1001, 1004, and 1005 that may be used to exchange data between various components.

The components included in the electronic device 1000 may correspond to components included in the electronic device 101 of FIG. 1, and the electronic device 1000 may include all or some of the components included in the electronic device 101 in addition to the components shown in FIG. 10. According to various embodiments, the processor 120 of FIG. 1 may include all or some of the control circuit 1010, the image processor 1030, and the statistics processing module 1035. Thus, the control circuit 1010 may mean the processor 120 and may be included in the processor, together with another module.

According to an embodiment, the control circuit 1010 of the electronic device 1000 may control operations of components included in the electronic device 1000 and may execute instructions stored in the memory 1040 of the electronic device 1000. The control circuit 1010 may mean the processor 120 of FIG. 1.

The control circuit 1010 may include at least one decompression module 1011. The decompression module 1011 may decompress data compressed in the other components of the image sensor 1020 or the electronic device 1000. Decompression may be performed in various ways, and a plurality of compressed image data may be simultaneously or sequentially decompressed through the at least one decompression module 1011.

According to an embodiment, the image sensor 1020 of the electronic device 1000 may include all or some of the components included in the camera module 180 of FIG. 2. The image sensor 1020 may also include a separate processor capable of independently controlling the components included in the image sensor 1020. It would be easily understood by those of ordinary skill in the art that the components included in the image sensor 1020 may not be construed as being limited by FIG. 10.

The image sensor 1020 may include a photodiode 1021. The photodiode 1021, which is a photosensitive element, may generate at least one electric signal by using light received from outside. The photodiode 1021 may include a pinned photodiode. The image sensor 1020 may include a pixel array (not shown) including the photodiode 1021. The pixel array may include a plurality of pixels including a plurality of photodiodes.

The image sensor 1020 may include an ADC 1023. The ADC 1023 may convert an analog electric signal generated from the photodiode 1021 into digital image data and output the digital image data.

The image sensor 1020 may include a fusion module 1025 capable of fusing at least two image data acquired through the image sensor 1020. The fusion module 1025 may fuse a plurality of image data acquired in the image sensor 1020 by using average fusion, additive fusion, complex fusion, divisional fusion, etc. (see FIGS. 14 through 17). The fusion module 1025 may fuse the plurality of image data pixel-by-pixel or line-by-line.

The image sensor 1020 may include at least one compression module 1027. The at least one compression module 1027 may compress the image data output from the ADC 1023 or the image data fused through the fusion module 1025. Compression may be performed in various ways, and the image data may be simultaneously or sequentially compressed through the at least one compression module 1027.

The image sensor 1020 may include a memory 1029. The memory 1029 may store the image data output from the ADC 1023 or the image data fused through the fusion module 1025.

According to an embodiment, the image processor 1030 of the electronic device 1000 may mean the image signal processor 260 included in the camera module 180 of FIG. 2. Meanwhile, in FIG. 10, the image processor 1030 is disclosed as being included separately from the control circuit 1010, but without being limited thereto, it would be easily understood that the image processor 1030 may be included in the control circuit 1010 or the image sensor 1020 according to a design change of the electronic device 1000.

According to an embodiment, the statistics processing module 1035 of the electronic device 1000 may manage data used for accurate and fast computation of the control circuit 1010. The statistics processing module 1035 may be included in the control circuit 1010 to perform a part of computation executed in the control circuit 1010.

According to an embodiment, the memory 1040 of the electronic device 1000 may mean the memory 130 included in the electronic device 101 of FIG. 1. The electronic device 1000 may include a plurality of memories 1040. Meanwhile, in FIG. 10, the memory 1040 is disclosed as being included separately from the control circuit 1010, but without being limited thereto, it would be easily understood that the memory 1040 may be included in the control circuit 1010 according to a design change of the electronic device 1000.

According to an embodiment, the control circuit 1010 and the image sensor 1020 of the electronic device 1000 may be connected with each other through at least one interface 1045, and exchange data through the at least one interface 345. For example, the at least one interface 1045, which is a C2C interface, may include an interface defined according to the mobile industry processor interface (MIPI). The control circuit 1010 and the image processor 1030 of the electronic device 1000 may be connected with each other through at least one interface (not shown), and exchange data through the at least one interface. For example, the at least one interface connecting the control circuit 1010 with the image processor 1030 may include an interface defined according to the MIPI. In addition, the at least one interface connecting the control circuit 1010 with the image processor 1030 may include various interfaces connecting the components included in the electronic device 1000.

According to an embodiment, the multiplexers 302, 304, 306, and 307 or the demultiplexers 301, 303, and 305, capable of transmitting and receiving data in various ways, may be provided between the components of the electronic device 1000. For example, the multiplexers 1002, 1003, and 1006, devices including a plurality of input lines and a single output line, may select one of a plurality of input analog or digital signals, and output the selected signal as the single output line. The demultiplexers 1001, 1004, and 1005, devices including a single input line and a plurality of output lines, may output a signal, input through the single input line, through an output line selected from among the plurality of output lines.

Meanwhile, FIG. 10 has been provided to facilitate a description of the present disclosure, rather than to limit the present disclosure. The structure of the electronic device 1000 according to various embodiments of the present disclosure is not limited by FIG. 10 and may be variously changed according to use and effects. The structure expressed as a module in the foregoing embodiment and embodiments to be described below may be understood to facilitate a description of a specific function or operation executed in the electronic device, and all functions or operations could be interpreted as being executed by a processor (e.g., the processor 120 of FIG. 1).

Figure 11A:
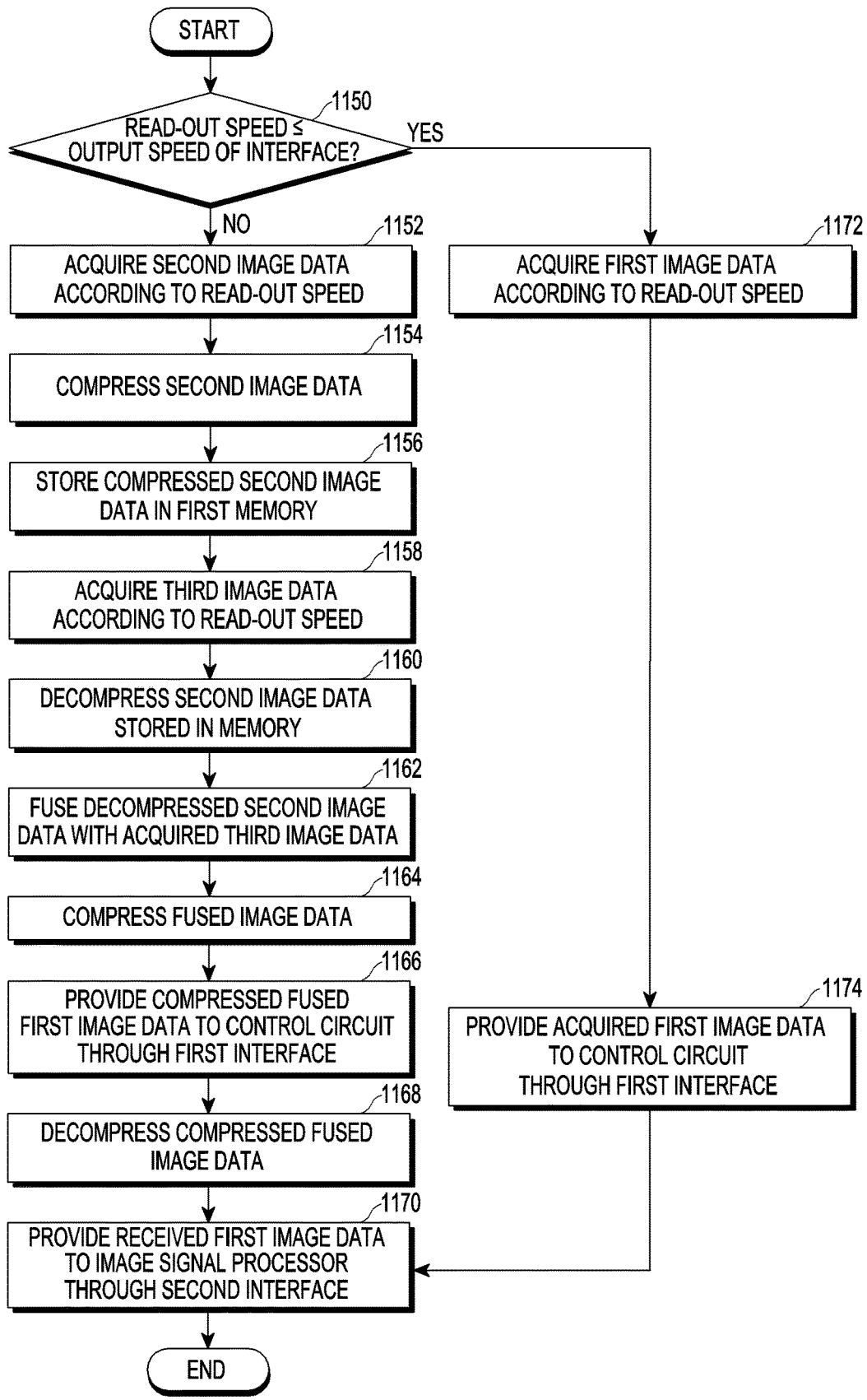
FIG. 11A through 11C are views for describing a method for fusing image data by using an electronic device, according to various embodiments.
Figure 11B:
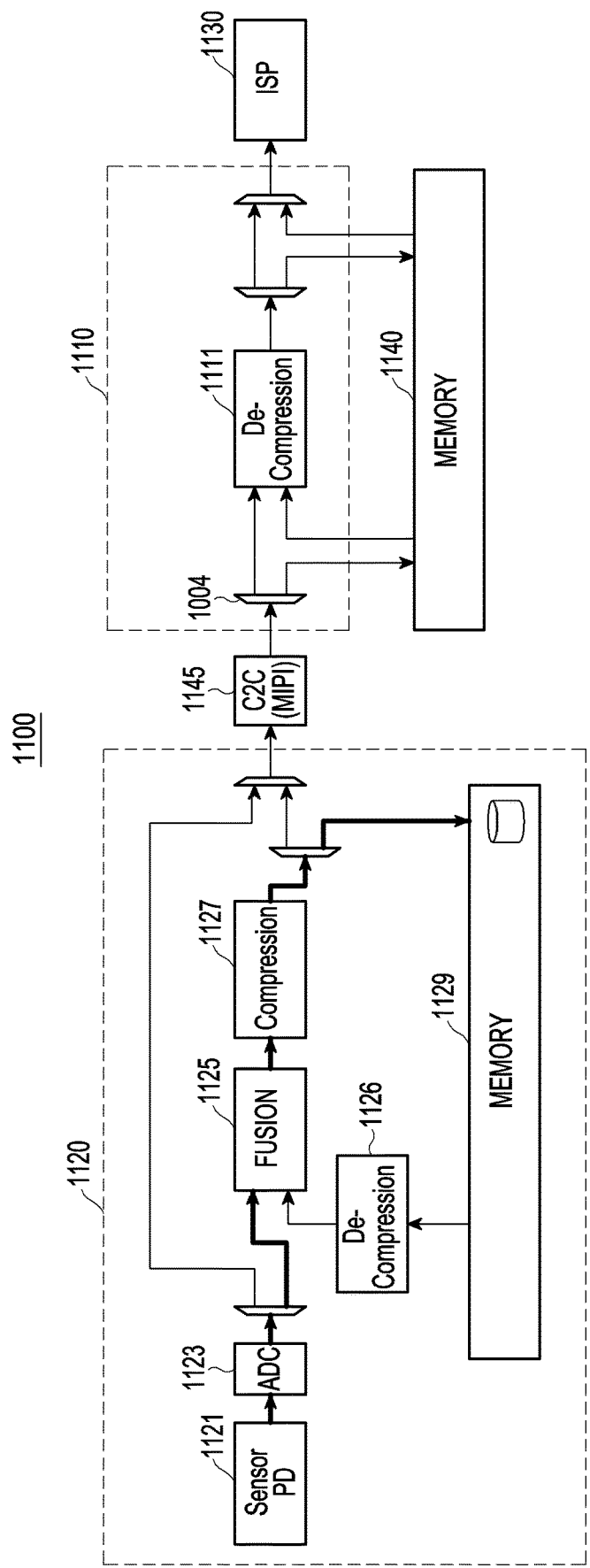
Figure 11C:
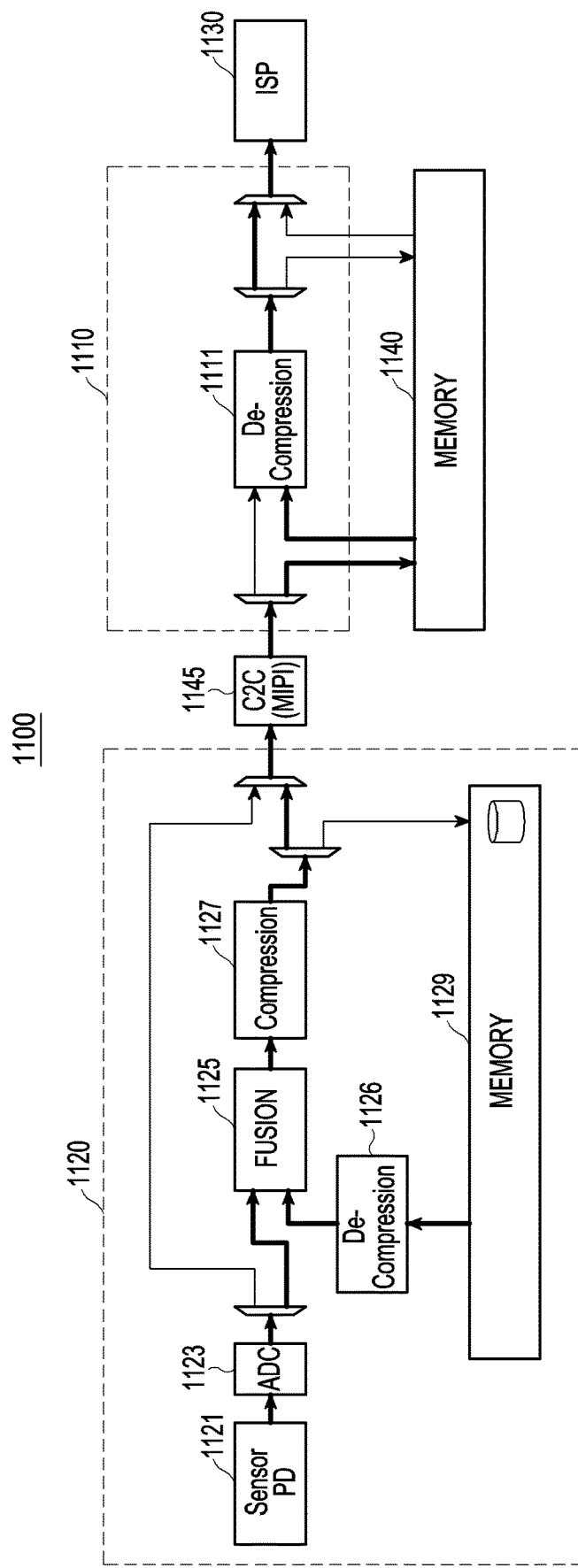

FIG. 11A through 11C are views for describing a method for fusing image data by using an electronic device, according to various embodiments.

More specifically, FIG. 11A is a flowchart for describing operations performed by an electronic device 1100 shown in FIGS. 11B and 11C. Thus, when the flowchart of FIG. 11A is described, the electronic device 1100 according to FIGS. 11B and 11C will be referred to.

A subject that performs the method may be a control circuit 1110 in the electronic device 1100 including the control circuit 1110 and an image sensor 1120. The control circuit 1110 may mean the processor 120 of FIG. 1. However, without being limited thereto, some of operations shown in FIG. 11A may be executed by a processor (not shown) separately included in an image processor 1130 (e.g., the image signal processor 260 of FIG. 2) or the image sensor 1120 (e.g., the image sensor 230 of FIG. 2). The electronic device 1100 according to various embodiments of the present disclosure may include all or some of the components included in the electronic device 101 of FIG. 1 or the electronic device 1000 of FIG. 10. Meanwhile, functions and characteristics of the components described in FIG. 10 may be applied to the embodiments corresponding to FIGS. 11A through 11C and a redundant description will be omitted.

In operation 1150, the processor 120 (e.g., the control circuit 1010) may determine whether the read-out speed of the image sensor 1120 is equal to or less than the output speed of an interface 1145. For example, when it is determined that the output speed of the interface 1145 is 30 fps and the read-out speed of the image sensor 1120 is 30 fps, operation 1172 may be performed ("Yes" in operation 1150). On the other hand, when it is determined that the output speed of the interface 1145 is 30 fps and the read-out speed of the image sensor 1120 is 60 fps, operation 1152 may be performed ("No" in operation 1150).

In operation 1172, the processor 120 (e.g., the control circuit 1010) may acquire first image data according to the read-out speed of the image sensor 1120. For example, when the read-out speed of the image sensor 1120 is equal to or less than the output speed of the interface 1145, the processor (e.g., the control circuit 1010) may not perform compression with respect to the acquired image data. In operation 1174, the processor 120 (e.g., the control circuit 1010) may transfer the acquired first image data to the control circuit 1110 through the interface 1145 according to the read-out speed of the image sensor 1120. In operation 1170, the processor 120 (e.g., the control circuit 1010) may transfer the received first image data to the image processor 1130 through at least one interface (not shown).

Operations 1152 through 1156 according to various embodiments will be described with reference to FIG. 11B.

In operation 1152, the processor 120 (e.g., the control circuit 1010) may acquire second image data according to the read-out speed. For example, the read-out speed of the image sensor 1120 may be 60 fps, and the output speed of the interface 1145 may be 30 fps. In this case, the photodiode 1121 of the image sensor 1120 may generate an analog electric signal by using light received from outside. The ADC 1123 of the image sensor 1120 may convert an analog electric signal generated from the photodiode 1121 into digital image data. The read-out process including an operation of generating the analog electric signal by using the light received from outside and an operation of converting the generated analog electric signal into the digital image data may be performed once per 1/60 seconds according to the read-out speed set to 60 fps.

In operation 1154, the processor 120 (e.g., the control circuit 1010) may transfer the acquired second image data to a fusion module 1125. The processor 120 (e.g., the control circuit 1010) may determine whether there is pre-stored image data in a memory 1129. When no pre-stored image data is found in the memory 1129, the second image data may pass through the fusion module 1125 and be transferred to a compression module 1127. The processor 120 (e.g., the control circuit 1010) may compress the second image data through the compression module 1127.

In operation 1156, the processor 120 (e.g., the control circuit 1010) may store the compressed second image data in the memory 1129.

Operations 1158 through 1170 according to various embodiments will be described with reference to FIG. 11C. An embodiment corresponding to FIG. 11C may mean a process performed successively from an embodiment corresponding to FIG. 11B. The embodiment corresponding to FIG. 11C may start during execution of the embodiment corresponding to FIG. 11B.

In operation 1158, the processor 120 (e.g., the control circuit 1010) may acquire third image data according to the read-out speed. For example, the read-out speed of the image sensor 1120 may be 60 fps, and the output speed of the interface 1145 may be 30 fps. The processor 120 (e.g., the control circuit 1010) may acquire third image data at 60 fps. The processor 120 (e.g., the control circuit 1010) may transfer the acquired third image data to the fusion module 1125.

In operation 1160, the processor 120 (e.g., the control circuit 1010) may determine whether there is pre-stored image data in the memory 1129, in response to transferring of the acquired third image data to the fusion module 1125. When the pre-stored image data is found in the memory 1129, the processor 120 (e.g., the control circuit 1010) may decompress the image data, which has been pre-stored in the memory 1129, through the decompression module 1126. For example, the compressed second image data stored in the memory 1129 may be decompressed through the decompression module 1126 and transferred to the fusion module 1125.

In operation 1162, the processor 120 (e.g., the control circuit 1010) may fuse the decompressed second image data with the acquired third image data to generate fourth image data. The processor 120 (e.g., the control circuit 1010) may transfer the generated fourth image data to the compression module 1127.

In operation 1164, the processor 120 (e.g., the control circuit 1010) may compress the generated fourth image data through the compression module 1127.

In operation 1166, the processor 120 (e.g., the control circuit 1010) may transfer the compressed and fused fourth image data to the control circuit 1110 through the interface 1145.

In operation 1168, the processor 120 (e.g., the control circuit 1010) may store the compressed and fused fourth image data in a memory 1140. The processor 120 (e.g., the control circuit 1010) may also transfer the fourth image data stored in the memory 1140 to a decompression module 1111 to decompress the fourth image data. According to another embodiment, the processor 120 (e.g., the control circuit 1010) may transfer the compressed and fused fourth image data to the decompression module 111 to decompress the fourth image data, without storing the same in the memory 1140.

In operation 1170, the processor 120 (e.g., the control circuit 1010) may transfer the decompressed fourth image data to the image processor 1130 through at least one interface (not shown). Herein, the at least one interface may mean an interface that plays the same role as the interface 1145. The at least one interface may not be limited as long as it is a means through which data exchange is possible between the component of the processor 120 (e.g., the control circuit 1010). According to another embodiment, when the image processor 1130 is designed as being included in the control circuit 1110, at least one interface may be omitted.

Some of the operations shown in FIG. 11A may be omitted or repeated a plurality of times. Each of the operations shown in FIG. 11A may be reasonably regarded as an embodiment, and any one of them may not be restrictively construed as depending on another operation.

Figure 12:
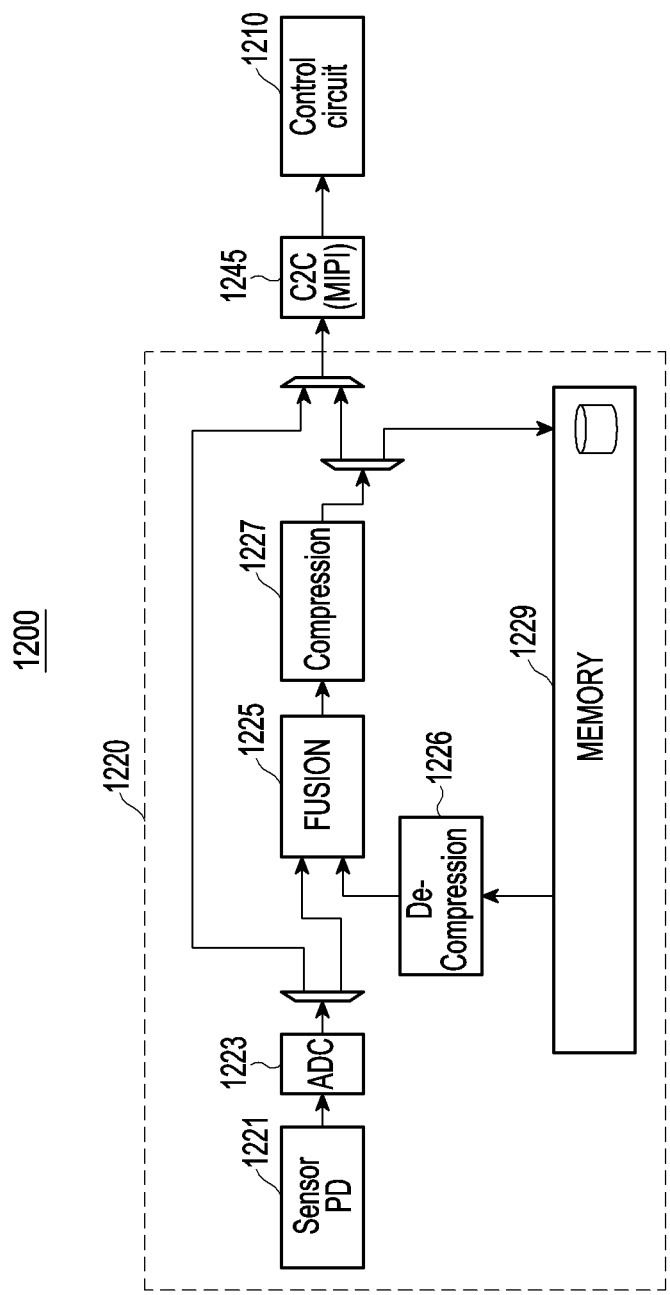
FIG. 12 is a view for describing a method for fusing image data in an infinite impulse response (IIR) manner in an electronic device, according to various embodiments.

FIG. 12 is a view for describing a method for fusing image data in an IIR manner in an electronic device, according to various embodiments.

A subject that performs the method may be a control circuit 1210 or at least one processor included in an image sensor 1220 in an electronic device 1200 including the control circuit 1210 and the image sensor 1220. The control circuit 1210 or the at least one processor included in the image sensor 1220 may mean the processor 120 of FIG. 1.

The electronic device 1200 according to various embodiments of the present disclosure may include all or some of the components included in the electronic device 101 of FIG. 1 or the electronic device 1000 of FIG. 10. Meanwhile, functions and characteristics of the components described in FIG. 10 may be applied to the embodiment corresponding to FIG. 12 and a redundant description will be omitted.

According to an embodiment, the electronic device 1200 may include the control circuit 1210, the image sensor 1220, and an interface 1245. The image sensor 1220 may include a fusion module 1225 capable of fusing at least two image data. The image sensor 1220 may include at least one compression module 1227 and at least one decompression module 1226. The image sensor 1220 may include a photodiode 1221, an ADC 1223, and a memory 1229.

According to an embodiment, the electronic device 1200 may acquire first image data through the photodiode 1221 and the ADC 1223 of the image sensor 1220. The electronic device 1200 may transfer the acquired first image data to the fusion module 1225. In this case, the electronic device 1200 may determine whether there is pre-stored image data in the memory 1229. When no pre-stored image data is found in the memory 1229, the first image data may pass through the fusion module 1225 and be transferred to the compression module 1227. The electronic device 1200 may compress the first image data through the compression module 1227. The electronic device 1200 may store the compressed first image data in the memory 1229.

The electronic device 1200 may acquire second image data through the photodiode 1221 and the ADC 1223 of the image sensor 1220. The electronic device 1200 may transfer the acquired second image data to the fusion module 1225. In this case, the electronic device 1200 may determine whether there is pre-stored image data in the memory 1229. When the pre-stored image data is found in the memory 1229, the electronic device 1200 may decompress the image data, which has been pre-stored in the memory 1229, through the decompression module 1226. For example, the compressed first image data stored in the memory 1229 may be decompressed through the decompression module 1226 and transferred to the fusion module 1225. The fusion module 1225 may generate third image data by fusing the decompressed first image data with the decompressed second image data.

According to an embodiment, when the third image data is generated through the fusion module 1225, the electronic device 1200 may determine whether a preset number of times of fusion is satisfied. For example, when the preset number of times of fusion (e.g., 1) is satisfied, the generated third image data may be compressed through the compression module 1227 and transferred to the control circuit 1210 through the interface 1245. On the other hand, when the preset number of times of fusion is not satisfied, the generated third image data may be compressed through the compression module 1227 and then stored in the memory 1229.

The electronic device 1200 may acquire fourth image data through the photodiode 1221 and the ADC 1223 of the image sensor 1220. The electronic device 1200 may transfer the acquired fourth image data to the fusion module 1225. In this case, the electronic device 1200 may determine whether there is pre-stored image data in the memory 1229. When the pre-stored image data is found in the memory 1229, the electronic device 1200 may decompress the image data, which has been pre-stored in the memory 1229, through the decompression module 1226. For example, the compressed third image data stored in the memory 1229 may be decompressed through the decompression module 1226 and transferred to the fusion module 1225. The fusion module 1225 may generate third image data by fusing the decompressed third image data with the decompressed fourth image data.

According to an embodiment, when the fifth image data is generated through the fusion module 1225, the electronic device 1200 may determine whether a preset number of times of fusion is satisfied. For example, when the preset number of times of fusion (e.g., 2) is satisfied, the generated fifth image data may be compressed through the compression module 1227 and transferred to the control circuit 1210 through the interface 1245. On the other hand, when the preset number of times of fusion is not satisfied, the generated fifth image data may be compressed through the compression module 1227 and then stored in the memory 1229.

In this way, the electronic device 1200 according to an embodiment may fuse image data in an IIR manner.

Figure 13:
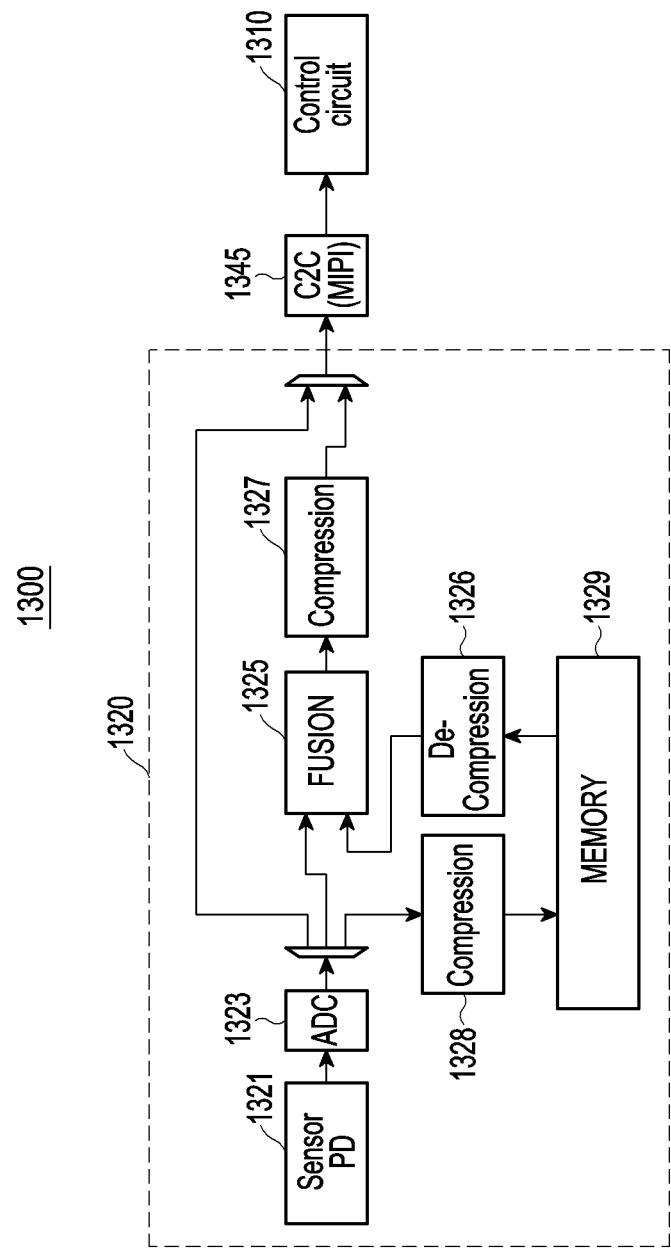
FIG. 13 is a view for describing a method for fusing image data in a finite impulse response (FIR) manner in an electronic device, according to various embodiments.

FIG. 13 is a view for describing a method for fusing image data in a FIR manner in an electronic device, according to various embodiments.

A subject that performs the method may be a control circuit 1310 or at least one processor included in an image sensor 1320 in an electronic device 1300 including the control circuit 1310 and the image sensor 1320. The control circuit 1310 or the at least one processor included in the image sensor 1320 may mean the processor 120 of FIG. 1.

The electronic device 1300 according to various embodiments of the present disclosure may include all or some of the components included in the electronic device 101 of FIG. 1 or the electronic device 1000 of FIG. 10. Meanwhile, functions and characteristics of the components described in FIG. 10 may be applied to the embodiment corresponding to FIG. 13 and a redundant description will be omitted.

According to an embodiment, the electronic device 1300 may include the control circuit 1310, the image sensor 1320, and an interface 1345. The image sensor 1320 may include a fusion module 1325 capable of fusing at least two image data. The image sensor 1320 may include at least one compression modules 1327 and 1328 and at least one decompression module 1326. The image sensor 1320 may include a photodiode 1321, an ADC 1323, and a memory 1329.

According to an embodiment, the electronic device 1300 may acquire first image data through the photodiode 1321 and the ADC 1323 of the image sensor 1320. The electronic device 1300 may transfer the acquired first image data to the compression module 1328 to compress the first image data. The electronic device 1300 may store the compressed first image data in the memory 1329.

The electronic device 1300 may determine whether the number of image data stored in the memory 1329 meets a preset number, in response to storage of the compressed first image data in the memory 1329. For example, when determining that the preset number (e.g., 1) is met, the electronic device 1300 may decompress the compressed first image data stored in the memory 1329 through the at least one decompression module 1326. The decompressed first image data may pass through the fusion module 1325 and be compressed through the compression module 1327. The electronic device 1300 may transfer the compressed first image data to the control circuit 1310 through the interface 1345.

When determining that the preset number is not met, the electronic device 1300 may acquire second image data through the photodiode 1321 and the ADC 1323 of the image sensor 1320. The electronic device 1300 may transfer the acquired second image data to the compression module 1328 to compress the second image data. The electronic device 1300 may store the compressed second image data in the memory 1329.

The electronic device 1300 may determine whether the number of image data stored in the memory 1329 meets a preset number, in response to storage of the compressed second image data in the memory 1329. For example, when determining that the preset number (e.g., 2) is met, the electronic device 1300 may simultaneously or sequentially decompress the compressed first image data and second image data, stored in the memory 1329, through the at least one decompression module 1326. The decompressed first image data and second image data may be transferred as an input of the fusion module 1325. The fusion module 1325 may generate third image data by fusing the decompressed first image data with the decompressed second image data. The generated third image data may be compressed through the compression module 1327. The electronic device 1300 may transfer the compressed third image data to the control circuit 1310 through the interface 1345.

When determining that the preset number is not met, the electronic device 1300 may acquire the fourth image data through the photodiode 1321 and the ADC 1323 of the image sensor 1320. The electronic device 1300 may transfer the acquired fourth image data to the compression module 1328 to compress the fourth image data. The electronic device 1300 may store the compressed fourth image data in the memory 1329. The current operation may be repeatedly performed until it is determined that the preset number is satisfied.

Meanwhile, one decompression module is shown in FIG. 13, but a plurality of decompression modules may be provided corresponding to a preset number, and the fusion module 1325 may simultaneously receive image data decompressed through the plurality of decompression modules and perform fusion with respect to the received image data.

FIGS. 14 through 17 are views for describing various methods for fusing image data in an electronic device, according to various embodiments.

Figure 14:
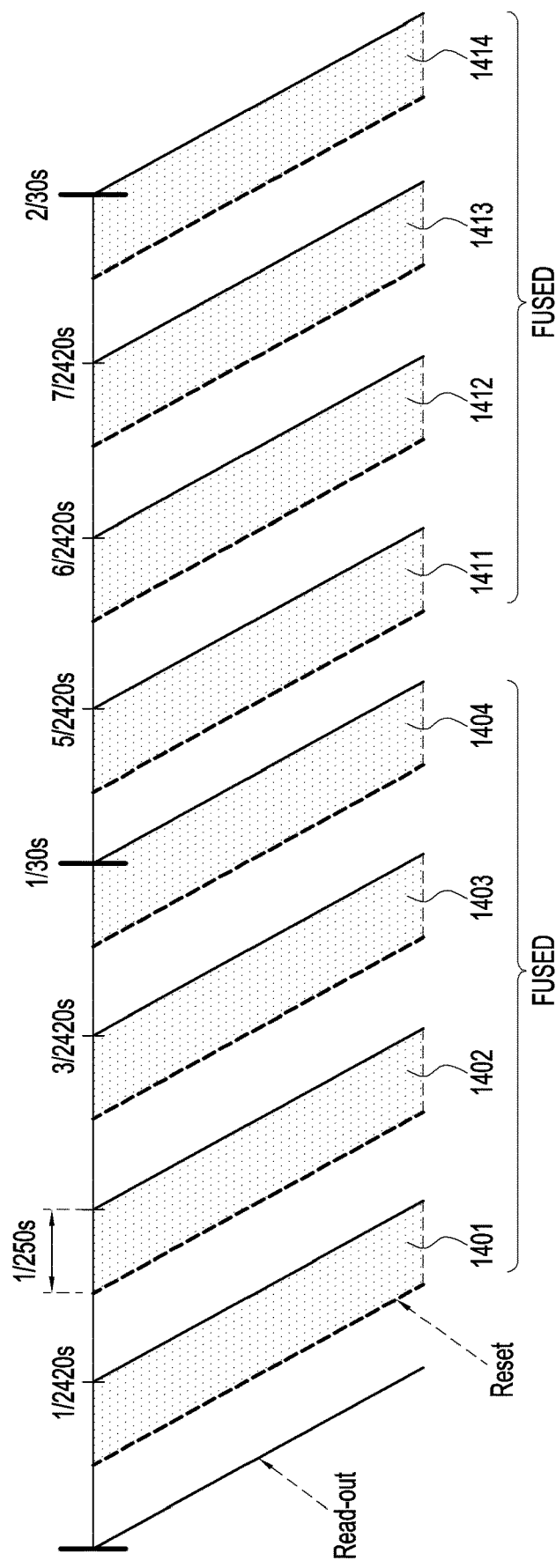
FIGS. 14 through 17 are views for describing various methods for fusing image data in an electronic device, according to various embodiments.

In FIG. 14 is shown a method to acquire a plurality of image data and average-fuse the plurality of acquired image data when a read-out speed of an image sensor is set to 120 fps.

For example, when the read-out speed of the image sensor is 120 fps, first image data 1401, second image data 1402, third image data 1403, and fourth image data 1404 may be acquired during $1/30$ seconds. It may be seen from FIG. 14 that the first image data 1401, the second image data 1402, the third image data 1403, and the fourth image data 1404 are sequentially acquired one by one per $1/120$ seconds, each of which is acquired based on a normal exposure time of $1/250$ seconds.

According to an embodiment, the first image data 1401, the second image data 1402, the third image data 1403, and the fourth image data 1404 acquired during $1/30$ seconds may be average-fused through a fusion module. Herein, average fusion may mean a fusion scheme of summing pixel values of a plurality of image data and then dividing the summed pixel values by the number of plural image data. For example, the electronic device may perform average fusion by summing the respective pixel values of the first image data 1401, the second image data 1402, the third image data 1403, and the fourth image data 1404 and dividing the summed pixel values by 4. In this way, the electronic device may perform average fusion by summing respective pixel values of fifth image data 1411, sixth image data 1412, seventh image data 1413, and eighth image data 1414 and dividing the summed pixel values by 4.

Figure 15:
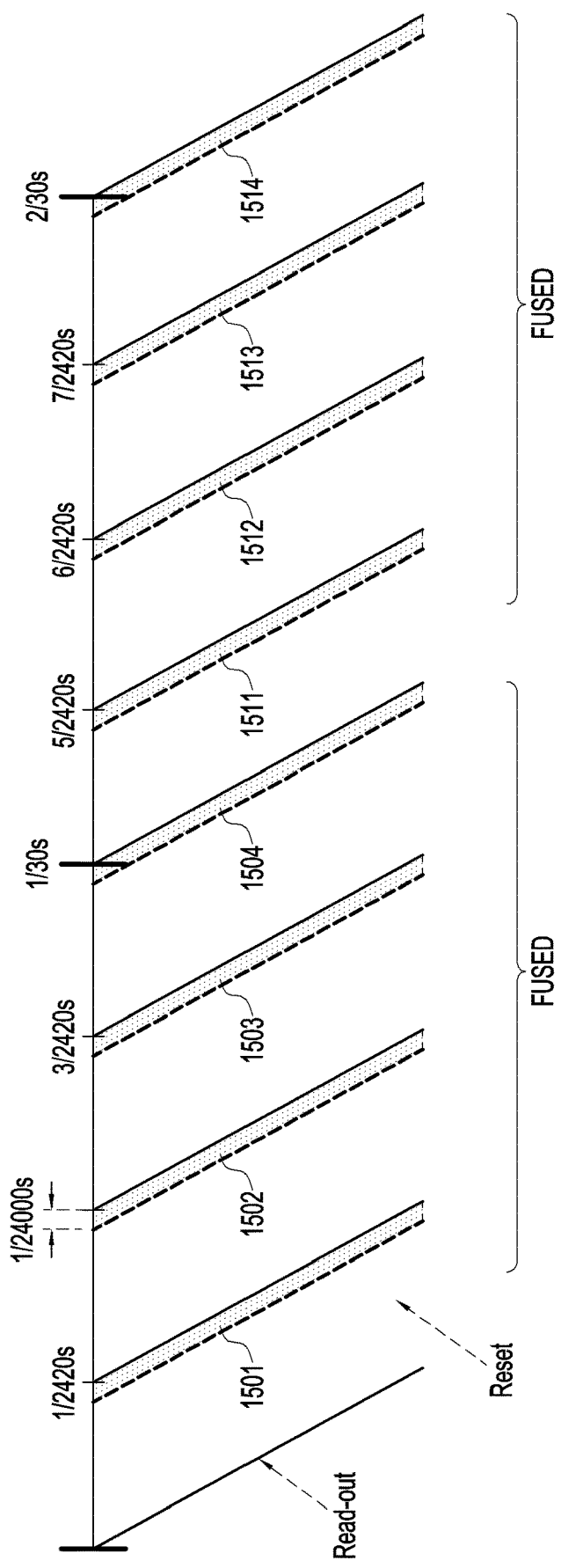

In FIG. 15 is shown a method to acquire a plurality of image data and additive-fuse the plurality of acquired image data when the read-out speed of the image sensor is set to 120 fps.

For example, when the read-out speed of the image sensor is 120 fps, first image data 1501, second image data 1502, third image data 1503, and fourth image data 1504 may be acquired during $1/30$ seconds. It may be seen from FIG. 15 that the first image data 1501, the second image data 1502, the third image data 1503, and the fourth image data 1504 are sequentially acquired one by one per $1/120$ seconds, each of which is acquired based on a normal exposure time of $1/1000$ seconds.

According to an embodiment, the first image data 1501, the second image data 1502, the third image data 1503, and the fourth image data 1504 acquired during $1/30$ seconds may be additive-fused through a fusion module. Herein, additive fusion may mean a fusion scheme to add respective pixel values of the plurality of image data. For example, the electronic device may perform additive fusion by adding the respective pixel values of the first image data 1501, the second image data 1502, the third image data 1503, and the fourth image data 1504. In this way, the electronic device may perform additive fusion by adding respective pixel values of fifth image data 1511, sixth image data 1512, seventh image data 1513, and eighth image data 1514.

Figure 16:
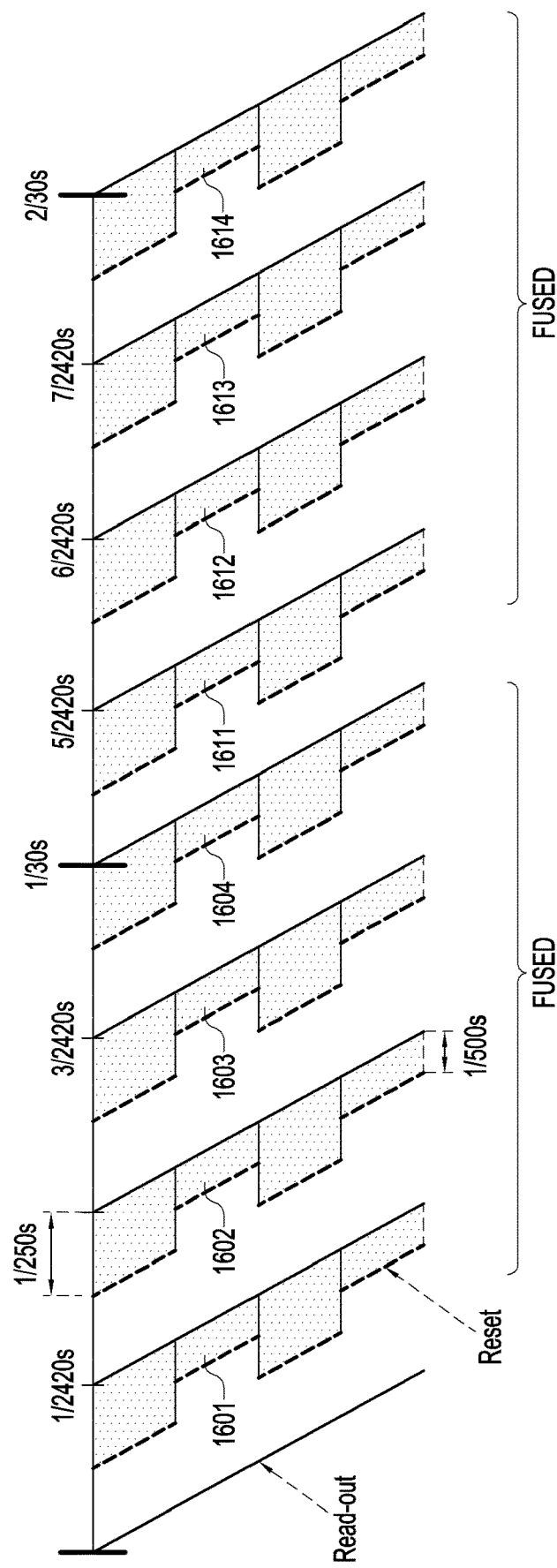

In FIG. 16 is shown a method to acquire a plurality of image data and complex-fuse the plurality of acquired image data when the read-out speed of the image sensor is set to 120 fps.

For example, when the read-out speed of the image sensor is 120 fps, first image data 1601, second image data 1602, third image data 1603, and fourth image data 1604 may be acquired during $1/30$ seconds. It may be seen from FIG. 16 that the first image data 1601, the second image data 1602, the third image data 1603, and the fourth image data 1604 are sequentially acquired one by one per $1/120$ seconds.

Meanwhile, when acquiring image data through a pixel array of the image sensor, the electronic device may control the amount of exposure differently for each pixel line of the pixel array, thereby configuring single image data with data acquired according to various amounts of exposure. A fusion scheme to perform average fusion or additive fusion by using the foregoing image data may be referred to as complex fusion.

According to an embodiment, the first image data 1601, the second image data 1602, the third image data 1603, and the fourth image data 1604 acquired during $1/30$ seconds may be divisional-fused through a fusion module. It may be seen from FIG. 16 that the amount of exposure differs for each pixel line of each of the first image data 1601, the second image data 1602, the third image data 1603, and the fourth image data 1604. For example, the electronic device may perform complex fusion by average-fusing or additive-fusing fifth image data 1611, sixth image data 1612, seventh image data 1613, and eighth image data 1614.

Figure 17:
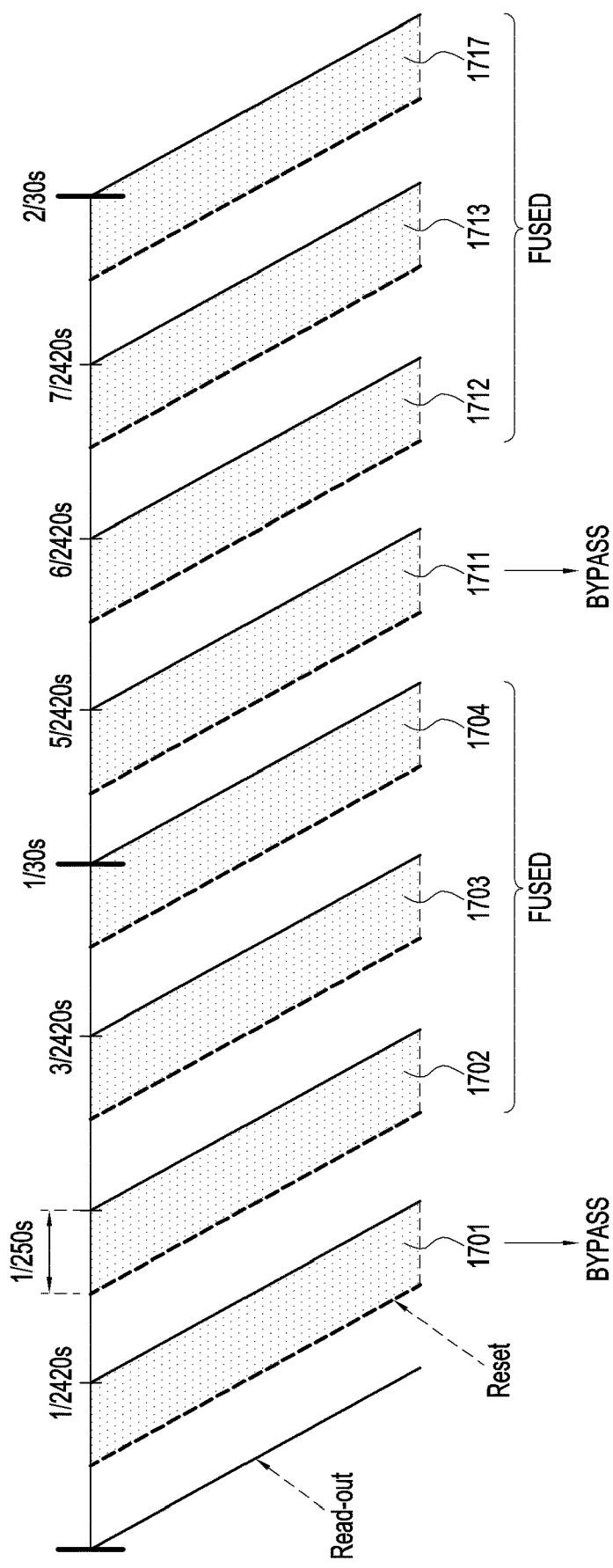

In FIG. 17 is shown a method to acquire a plurality of image data and divisional-fuse the plurality of acquired image data when the read-out speed of the image sensor is set to 120 fps.

For example, when the read-out speed of the image sensor is 120 fps, first image data 1701, second image data 1702, third image data 1703, and fourth image data 1704 may be acquired during $1/30$ seconds. It may be seen from FIG. 17 that the first image data 1701, the second image data 1702, the third image data 1703, and the fourth image data 1704 are sequentially acquired one by one per $1/120$ seconds, each of which is acquired based on a normal exposure time of $1/250$ seconds.

According to an embodiment, the first image data 1701, the second image data 1702, the third image data 1703, and the fourth image data 1704 acquired during $1/30$ seconds may be divisional-fused through a fusion module. Herein, complex fusion may mean a fusion scheme to perform average fusion or additive fusion by using other image data than some of image data acquired during a preset time. For example, the electronic device may perform divisional fusion by performing average fusion with respect to first image data 1701, second image data 1702, third image data 1703, and fourth image data 1704, except for the first image data 1701 among the first image data 1701, the second image data 1702, the third image data 1703, and the fourth image data 1714, thereby performing divisional fusion. In this way, the electronic device may perform divisional fusion by performing average fusion with respect to sixth image data 1712, seventh image data 1713, and eighth image data 1714 except for fifth image data 1711 among the fifth image data 1711, the sixth image data 1712, the seventh image data 1713, and the eighth image data 1714, thereby performing divisional fusion.

Figure 18:
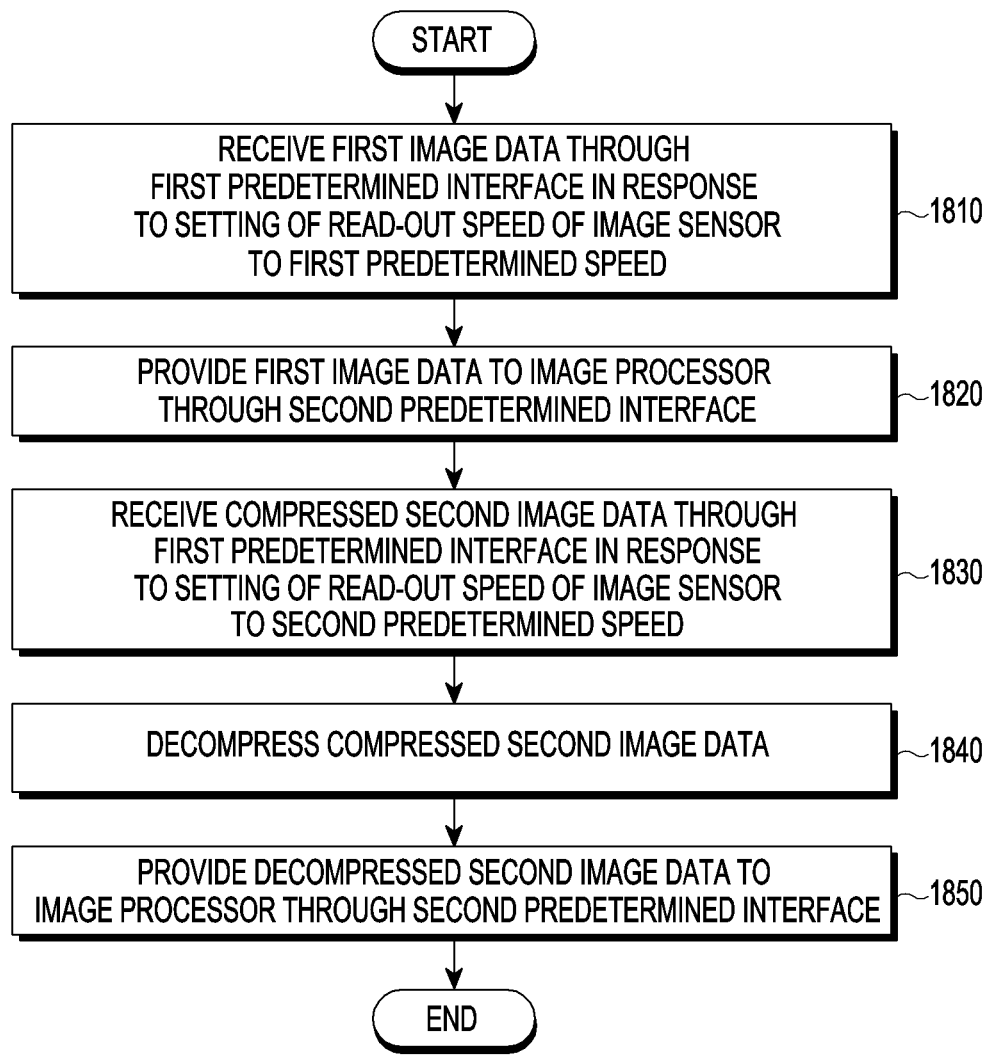
FIG. 18 is a view for describing operations performed in an electronic device, according to various embodiments.

FIG. 18 is a view for describing operations performed in an electronic device, according to various embodiments.

In operation 1810, the processor 120 of the electronic device 101 may receive first image data through a first predetermined interface in response to setting of a read-out speed of an image sensor to a first predetermined speed.

In operation 1820, the processor 120 may transfer the received first image data to an image processor through a second predetermined interface.

For example, when the first predetermined speed related to the read-out speed is less than or equal to an output speed of the first predetermined interface, a control circuit of the electronic device may determine that compression with respect to the acquired first image data does not need to be performed. In this case, the control circuit of the electronic device may receive the first image data through the first predetermined interface. The control circuit of the electronic device may also transfer the received first image data to the image processor through the second predetermined interface.

In operation 1830, the processor 120 may receive the compressed second image data through a first predetermined interface in response to setting of the read-out speed of the image sensor to the second predetermined speed.

In operation 1840, the processor 120 may decompress the compressed second image data.

In operation 1850, the processor 120 may transfer the decompressed second image data to the image processor through the second predetermined interface.

For example, when the second predetermined speed related to the read-out speed is greater than the output speed of the first predetermined interface, the control circuit of the electronic device may determine that compression with respect to the acquired second image data needs to be performed. In this case, the control circuit of the electronic device may compress the second image data through the compression module included in the electronic device. The control circuit of the electronic device may also receive the compressed second image data through the first predetermined interface. The control circuit of the electronic device may decompress the compressed second image data received through the first predetermined interface through the decompression module included in the electronic device. The control circuit of the electronic device may also transfer the decompressed second image data to the image processor through the second predetermined interface.

The electronic device according to the current embodiment may be the electronic device 101 of FIG. 1 or the electronic device 300 of FIG. 3, and the control circuit may be the processor 120 of FIG. 1 or the control circuit 310 of FIG. 3.

Figure 19:
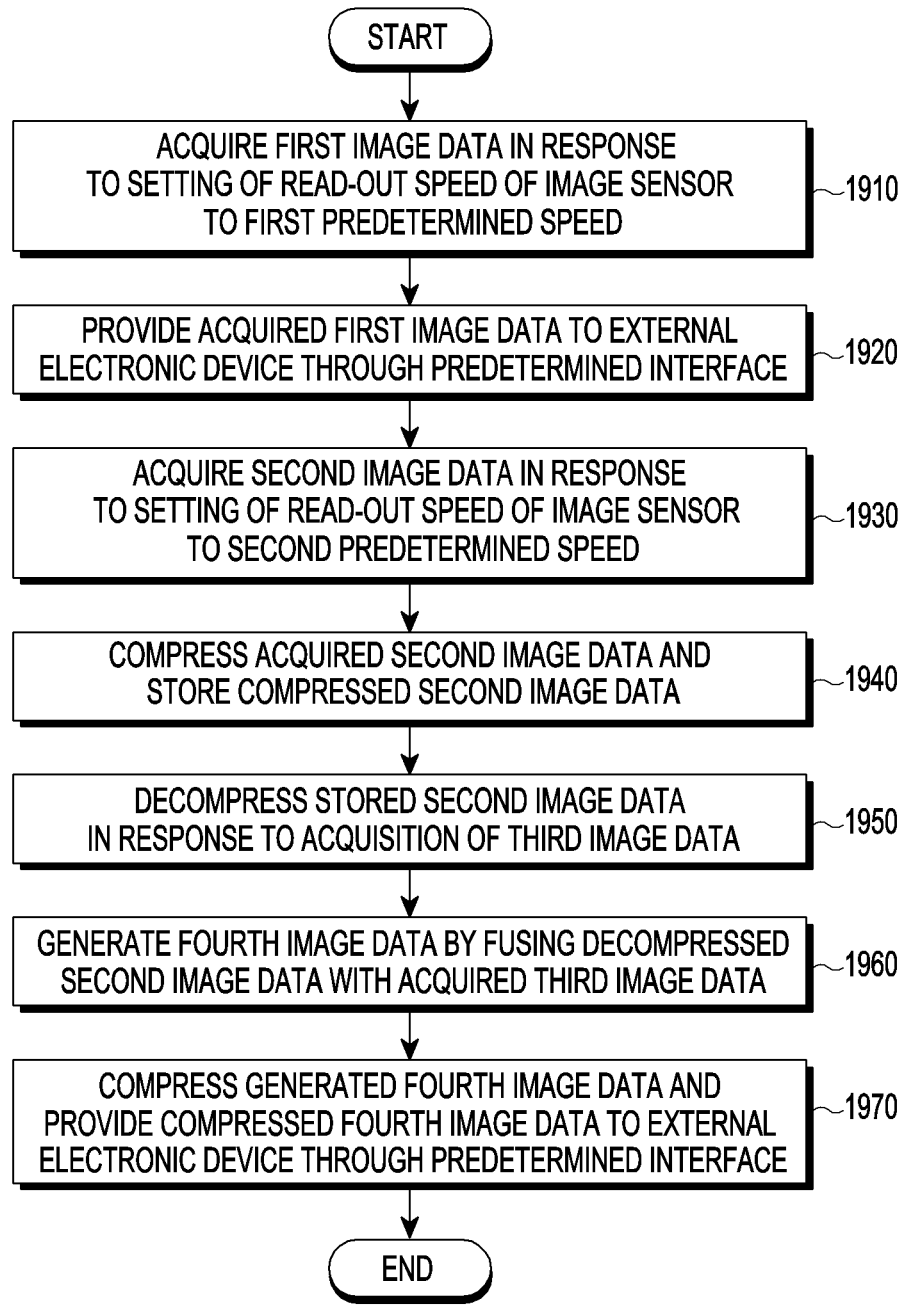
FIG. 19 is a view for describing operations performed in an electronic device, according to various embodiments.

FIG. 19 is a view for describing operations performed in an electronic device, according to various embodiments.

In operation 1910, the image sensor may acquire the first image data in response to setting of the read-out speed of the image sensor to the first predetermined speed.

In operation 1920, the image sensor may transfer the acquired first image data to an external electronic device through a predetermined interface.

For example, when the first predetermined speed related to the read-out speed is less than or equal to the output speed of the predetermined interface, the image sensor may determine that compression with respect to the acquired first image data does not need to be performed. In this case, the image sensor may transfer the acquired first image data to the external electronic device through the predetermined interface.

In operation 1930, the image sensor may acquire the second image data in response to setting of the read-out speed of the image sensor to the second predetermined speed.

In operation 1940, the image sensor may compress the acquired second image data and store the compressed second image data.

In operation 1950, the image sensor may decompress the stored second image data in response to acquisition of the third image data.

In operation 1960, the image sensor may generate the fourth image data by fusing the decompressed second image data with the acquired third image data.

In operation 1970, the image sensor may compress the generated fourth image data and transfer the compressed fourth image data to the external electronic device through the predetermined interface.

For example, when the second predetermined speed related to the read-out speed is greater than the output speed of the first predetermined interface, the image sensor may determine that compression with respect to the acquired second image data needs to be performed. In this case, the image sensor may compress the second image data through the compression module included in the image sensor. The image sensor may store the compressed second image data in the memory included in the image sensor. The image sensor may decompress the stored second image data in response to acquisition of the third image data. In this way, the image sensor may generate the fourth image data by fusing the decompressed second image data with the newly acquired third image data through the fusion module included in the image sensor. The image sensor may re-compress the generated fourth image data through the compression module included in the image sensor. The image sensor may transfer the compressed fourth image data to the external electronic device through the predetermined interface.

The electronic device according to the current embodiment may be the electronic device 101 of FIG. 1 or the electronic device 1000 of FIG. 10, and the foregoing operations may be performed by at least one processor (e.g., the processor 120 of FIG. 1) included in the image sensor or the control circuit 1010 of FIG. 10.

A method for fusing an image in an electronic device having a control circuit according to various embodiments of the present disclosure includes, in response to setting of a read-out speed of an image sensor of the electronic device to a first predetermined speed, receiving first image data through a first predetermined interface of the electronic device, the first image data having been acquired through the image sensor and not having been compressed through a compression module included in the image sensor, and transferring the first image data to an image processor included in the electronic device through a second predetermined interface of the electronic device, by the control circuit, and in response to setting of the read-out speed of the image sensor to a second predetermined speed, receiving second image data through the first predetermined interface, the second image data having been acquired through the image sensor and compressed through the compression module, decompressing the received second image data through one or more decompression modules included in the control circuit, and transferring the decompressed second image data to the image processor through the second predetermined interface, by the control circuit.

The method according to various embodiments of the present disclosure may further include storing at least one of the compressed second image data or the decompressed second image data in a memory of the electronic device.

The method according to various embodiments of the present disclosure may further include, in response to setting of the read-out speed of the image sensor to the second predetermined speed, receiving one or more image data through the first predetermined interface, the one or more image data having been acquired through the image sensor and compressed by the compression module, and storing the compressed one or more image data in the memory, in response to storage of a predetermined number of compressed image data in the memory, decompressing the compressed image data stored in the memory through the one or more decompression modules, generating third image data by fusing the decompressed image data through a fusion module of the electronic device, and transferring the generated third image data to the image processor through the second predetermined interface.

The method according to various embodiments of the present disclosure may further include, in response to setting of the read-out speed of the image sensor to the second predetermined speed, receiving third image data through the first predetermined interface, the third image data having been acquired through the image sensor and compressed through the compression module, and decompressing the compressed third image data through the one or more decompression modules, generating fourth image data by fusing the decompressed second image data with the decompressed third image data through a fusion module of the electronic device, and transferring the generated fourth image data to the image processor through the second predetermined interface.

The method according to various embodiments of the present disclosure may further include, compressing the generated fourth image data through one or more compression modules included in the control circuit, and storing the compressed fourth image data in the memory, in response to setting of the read-out speed of the image sensor to the second predetermined speed, receiving fifth image data through the first predetermined interface, the fifth image data having been acquired through the image sensor and compressed through the compression module, and decompressing the compressed fifth image data through the one or more decompression modules, generating sixth image data by fusing the fourth image data stored in the memory with the decompressed fifth image data through the fusion module, and transferring the generated sixth image data to the image processor through the second predetermined interface.

The method according to various embodiments of the present disclosure may further include, in response to setting of the fusion module in a first mode, transferring at least one of the decompressed second image data or the decompressed third image data to a statistics processing module of the electronic device, and in response to setting of the fusion module in a second mode, transferring the generated fourth image data to the statistics processing module.

In the method according to various embodiments of the present disclosure, the first mode may be a mode in which pixel values of a plurality of image data acquired through the image sensor in a first period within a predetermined time are averagely fused, and the second mode may be a mode in which pixel values of a plurality of image data acquired through the image sensor in a second period within the predetermined time are additively fused.

In the method according to various embodiments of the present disclosure, each of the first predetermined interface and the second predetermined interface may include an interface conforming to the mobile industry processor interface (MIPI).

In the method according to various embodiments of the present disclosure, the first predetermined speed may be equal to or less than an output speed of the first predetermined interface, and the second predetermined speed may be larger than the output speed of the first predetermined interface.

A method of compressing an image by using an image sensor according to various embodiments of the present disclosure may include, in response to setting of a read-out speed of the image sensor to a first predetermined speed, acquiring first image data through the image sensor, and transferring the acquired first image data to an external electronic device through a predetermined interface, and in response to setting of the read-out speed of the image sensor to a second predetermined speed, acquiring second image data through the image sensor, compressing the acquired second image data through a compression module of the image sensor, storing the compressed second image data in a memory of the image sensor, decompressing the second image data stored in the memory through a decompression module of the image sensor, in response to acquisition of third image data through the image sensor, generating fourth image data by fusing the decompressed second image data with the acquired third image data through a fusion module of the image sensor, compressing the generated fourth image data through the compression module, and transferring the compressed fourth image data to the external electronic device through the predetermined interface.

What is claimed is:

1. An electronic device comprising:
   an image sensor;
   an image processor; and
   a control circuit electrically connected to the image sensor through a first predetermined interface, and to the image processor through a second predetermined interface,
   wherein the control circuit is configured to:
      in response to setting of a read-out speed of the image sensor to a first predetermined speed, receive first image data through the first predetermined interface, the first image data being obtained through the image sensor and being not compressed by the image sensor,
      transfer the first image data to the image processor through the second predetermined interface,
      in response to setting of the read-out speed of the image sensor to a second predetermined speed, receive second image data through the first predetermined interface, the second image data being obtained through the image sensor and being compressed by the image sensor,
      decompress the compressed second image data, and
      transfer the decompressed second image data to the image processor through the second predetermined interface.

2. The electronic device of claim 1, further comprising a memory,
   wherein the control circuit is configured to store at least one of the compressed second image data and the decompressed second image data in the memory.

3. The electronic device of claim 2,
   wherein the control circuit is configured to:
   in response to setting of the read-out speed of the image sensor to the second predetermined speed, receive one or more image data through the first predetermined interface, the one or more image data being obtained through the image sensor and being compressed by the image sensor,
   store the compressed one or more image data in the memory;
   in response to storage of a predetermined number of compressed image data in the memory, decompress the compressed image data stored in the memory,
   generate third image data by fusing the decompressed image data by the image sensor, and
   transfer the generated third image data to the image processor through the second predetermined interface.

4. The electronic device of claim 2,
   wherein the control circuit is configured to:
   in response to setting of the read-out speed of the image sensor to the second predetermined speed, receive third image data through the first predetermined interface, the third image data being obtained through the image sensor and being compressed by the image sensor,
   decompress the compressed third image data,
   generate fourth image data by fusing the decompressed second image data with the decompressed third image data; and
   transfer the generated fourth image data to the image processor through the second predetermined interface.

5. The electronic device of claim 4,
   wherein the control circuit is configured to:
   compress the generated fourth image data,
   store the compressed fourth image data in the memory,
   in response to setting of the read-out speed of the image sensor to the second predetermined speed, receive fifth image data through the first predetermined interface, the fifth image data being obtained through the image sensor and being compressed,
   decompress the compressed fifth image data,
   generate sixth image data by fusing the fourth image data stored in the memory with the decompressed fifth image data, and
   transfer the generated sixth image data to the image processor through the second predetermined interface.

6. The electronic device of claim 4,
   wherein the control circuit is configured to:
   if the fusion module is set in a first mode, process at least one of the decompressed second image data and the decompressed third image data based on the first mode, and
   if the fusion module is set in a second mode, process the generated fourth image data based on the second mode.

7. The electronic device of claim 6, wherein the first mode is a mode in which pixel values of a plurality of image data obtained through the image sensor in a first period within a predetermined time are averagely fused, and
   the second mode is a mode in which pixel values of a plurality of image data obtained through the image sensor in a second period within the predetermined time are additively fused.

8. An image sensor comprising:
   a memory; and
   a processor,
   wherein the processor is configured to:
   in response to setting of a read-out speed of the image sensor to a first predetermined speed, obtain first image data through the image sensor and transfer the obtained first image data to an external electronic device through a predetermined interface; and
   in response to setting of the read-out speed of the image sensor to a second predetermined speed, obtain second image data through the image sensor,
   compress the obtained second image data,
   store the compressed second image data in the memory,
   decompress the second image data stored in the memory,
   in response to obtaining of third image data through the image sensor, generate fourth image data by fusing the decompressed second image data with the obtained third image data, compress the generated fourth image data, and transfer the compressed fourth image data to the external electronic device through the predetermined interface.

9. A method for fusing an image in an electronic device having a control circuit, the method comprising:

in response to setting of a read-out speed of an image sensor of the electronic device to a first predetermined speed, receiving first image data through a first predetermined interface of the electronic device, the first image data being obtained through the image sensor and being not compressed by the image sensor, and transferring the first image data to an image processor included in the electronic device through a second predetermined interface of the electronic device, by the control circuit; and in response to setting of the read-out speed of the image sensor to a second predetermined speed, receiving second image data through the first predetermined interface, the second image data being obtained through the image sensor and being compressed by the image sensor, decompressing the received second image data by the control circuit, and transferring the decompressed second image data to the image processor through the second predetermined interface, by the control circuit.

10. The method of claim 9, further comprising storing at least one of the compressed second image data and the decompressed second image data in a memory of the electronic device.

11. The method of claim 10, further comprising:

in response to setting of the read-out speed of the image sensor to the second predetermined speed, receiving one or more image data through the first predetermined interface, the one or more image data being obtained through the image sensor and being compressed by the image sensor, and storing the compressed one or more image data in the memory;

in response to storage of a predetermined number of compressed image data in the memory, decompressing the compressed image data stored in the memory by the control circuit;

generating third image data by fusing the decompressed image data by the control circuit; and transferring the generated third image data to the image processor through the second predetermined interface.

12. The method of claim 10, further comprising:

in response to setting of the read-out speed of the image sensor to the second predetermined speed, receiving third image data through the first predetermined interface, the third image data being obtained through the image sensor and being compressed by the image sensor, and decompressing the compressed third image data by the control circuit;

generating fourth image data by fusing the decompressed second image data with the decompressed third image data by the control circuit; and transferring the generated fourth image data to the image processor through the second predetermined interface.

13. The method of claim 12, further comprising:

compressing the generated fourth image data by the control circuit, and storing the compressed fourth image data in the memory;

in response to setting of the read-out speed of the image sensor to the second predetermined speed, receiving fifth image data through the first predetermined interface, the fifth image data being obtained through the image sensor and being compressed by the control circuit, and decompressing the compressed fifth image data by the control circuit;

generating sixth image data by fusing the fourth image data stored in the memory with the decompressed fifth image data by the control circuit; and transferring the generated sixth image data to the image processor through the second predetermined interface.

14. The method of claim 12, further comprising:

in response to setting of a mode of the control circuit in a first mode, processing at least one of the decompressed second image data and the decompressed third image data based on the first mode; and in response to setting of a mode of the control circuit in a second mode, processing the generated fourth image data based on the second mode.

15. The method of claim 14, wherein the first mode is a mode in which pixel values of a plurality of image data obtained through the image sensor in a first period within a predetermined time are averagely fused, and the second mode is a mode in which pixel values of a plurality of image data obtained through the image sensor in a second period within the predetermined time are additively fused.

* * * * *